United States Patent
Yoshinaga et al.

(10) Patent No.: US 7,834,912 B2
(45) Date of Patent: Nov. 16, 2010

(54) ATTENTION LEVEL MEASURING APPARATUS AND AN ATTENTION LEVEL MEASURING SYSTEM

(75) Inventors: Tomoaki Yoshinaga, Yokohama (JP); Shigeki Nagaya, Tokyo (JP); Youichi Horii, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 11/737,159

(22) Filed: Apr. 19, 2007

(65) Prior Publication Data
US 2007/0247524 A1  Oct. 25, 2007

(30) Foreign Application Priority Data
Apr. 19, 2006   (JP)   ............... 2006-115152

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS

| | | | | |
|---|---|---|---|---|
| 5,649,061 | A * | 7/1997 | Smyth | 706/16 |
| 2002/0063709 | A1 * | 5/2002 | Gilbert et al. | 345/427 |
| 2003/0123027 | A1 * | 7/2003 | Amir et al. | 351/209 |
| 2004/0205651 | A1 * | 10/2004 | Dutta et al. | 715/530 |
| 2006/0110008 | A1 * | 5/2006 | Vertegaal et al. | 382/103 |
| 2006/0227103 | A1 * | 10/2006 | Koo et al. | 345/156 |
| 2006/0293921 | A1 * | 12/2006 | McCarthy et al. | 705/2 |
| 2007/0066916 | A1 * | 3/2007 | Lemos | 600/558 |

FOREIGN PATENT DOCUMENTS

| | | |
|---|---|---|
| JP | 10-048008 | 2/1998 |
| JP | 2001-008197 | 1/2001 |
| JP | 2006-020131 | 1/2006 |

* cited by examiner

*Primary Examiner*—James M Hannett
(74) *Attorney, Agent, or Firm*—Antonelli, Terry, Stout & Kraus, LLP.

(57) ABSTRACT

An attention level measuring apparatus, including: an eye direction measurement unit, which is configured to input image data and to measure an eye direction of a person photographed; an attention position information calculate unit, which is configured to calculate attention position information of a person, from the eye direction measured by an eye direction measurement unit; a person-attention-level calculate unit, which is configured to calculate person-attention-level information regarding a person-attention-level parameter about an attention target of a person, with using the attention position information calculated by the attention position information calculate unit; and an output control unit, which is configured to display graphic information produced upon basis of the calculated attention level information and a picture of the attention target, putting one upon the other.

16 Claims, 25 Drawing Sheets

FIG.4

| FRAME ID | CAMERA NUMBER | DETECTION TIME | MOTION OBJECT NUMBER | MOTION OBJECT REGION | FACE REGION INFORMATION | FACE FEATURES | FACE DIRECTION | EYE DIRECTION |
|---|---|---|---|---|---|---|---|---|
| 30a | 30b | 30c | 30d | 30e | 30f | 30g | 30h | 30i |

EYE DIRECTION
FACE DIRECTION

FACE DIRECTION
EYE DIRECTION

FIG.16

| PERSON PAYING ATTENTION | NUMBER OF TIMES OF PAYING ATTENTION | TIME-PERIOD [ms] | KIND OF ATTENTION | TIME |
|---|---|---|---|---|
| ARTICLE A | 1 | 2400 | A | 2005/10/02 21:22:12.321 |
| | 2 | 4200 | B | 2005/10/02 21:22:16.121 |
| | 1 | 600 | A | 2005/10/02 21:24:22.843 |
| | 3 | 1300 | D | 2005/10/02 21:27:02.021 |
| | ... | | | |
| ARTICLE B | 1 | 820 | B | 2005/10/02 21:57:02.821 |
| | ... | | | |

EQUATION OF PLANE INDICATIVE OF WALL
$x = 200$ ($0 \leqq y \leqq 200$, $0 \leqq z \leqq 500$)

EQUATION OF PLANE INDICATIVE OF FLOOR
$y = 0$ ($0 \leqq x \leqq 200$, $0 \leqq z \leqq 500$)

EQUATION OF PLANE INDICATIVE OF OBJECT A
$x = 200$ ($75 \leqq y \leqq 125$, $200 \leqq z \leqq 400$)

EQUATION OF PLANE INDICATIVE OF OBJECT B
$x = 200$ ($75 \leqq y \leqq 125$, $25 \leqq z \leqq 175$)

ATTENTION POSITION PROBABILITY
DISTRIBUTION REGION ON PLANE A

ATTENTION POSITION PROBABILITY
DISTRIBUTION REGION ON PLANE B

ATTENTION POINT

ATTENTION LEVEL MEASURING APPARATUS AND AN ATTENTION LEVEL MEASURING SYSTEM

BACKGROUND OF THE INVENTION (1) Field of the Invention

The present invention relates to an attention level measuring apparatus.

(2) Description of the Related Art

The conventional attention level measuring apparatus, as is described in Japanese Patent laying-Open No. Hei 10-48008 (1998), for example, is already known for measuring an attention level of a specific target, on which attentions are paid, thereby to analyze it, and to output it in the form of a table.

SUMMARY OF THE INVENTION

Within the attention level measuring and analyzing system described in the Japanese Patent laying-Open No. Hei 10-48008 (1998) mentioned above, it is necessary to confirm a monitoring output or a printing out of data about the attention level, with respect to the specific target of attention, but in the form of tables, and therefore it is impossible to grasp the data, intuitively, such as, distribution of the level of attention, etc.

It is also premised that a target of paying attention is designated within a restricted region, such as, commodity shelfs, etc., at a time point when starting measurement of the attention level; i.e., consideration was paid neither on measurement of attention level outside of the designated region nor on display of a result thereof, so on.

The present invention is made by paying consideration upon such problems as was mentioned above, and an object thereof is to provide a technology being suitable for grasping data of level of attention paid.

According to the present invention, there is provided an attention level measurement apparatus, comprising: an eye direction measurement unit, which is configured to input image data and to measure an eye direction of a person photographed; an attention position information calculate unit, which is configured to calculate attention position information of said person, from the eye direction measured by said eye direction measurement unit; an attention level calculate unit, which is configured to calculate attention level information about an attention target of said person, with using the attention position information calculated by said attention position information calculate unit; and an output control unit, which is configured to display graphic information produced upon basis of said calculated attention level information and a picture of said attention target, putting one upon the other.

With such the structures as mentioned above, it is possible to confirm the picture of the measuring target of attention level, and, in addition thereto, graphics showing the information of the attention level, and thereby enabling to grasp the attention level data, preferably. Also, displaying the information of attention level with the graphics enables to present the attention level, in various manners, and also enables to expand the measuring target of attention level up to an entire of space.

According to the present invention, it is possible to confirm the picture of the measuring target of attention level, in addition thereto, the information of the attention level, and thereby enabling to grasp the attention level data, preferably.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is a view for showing an example of the structures of frame information, which is produced in an eye direction measurement portion;

FIG. 16 is a view for showing an example of a table of the attention level information, which is memorized in a space information memory portion;

DETAILED DESCRIPTION OF THE PREFERRED EMBODIMENTS

Figure 1:
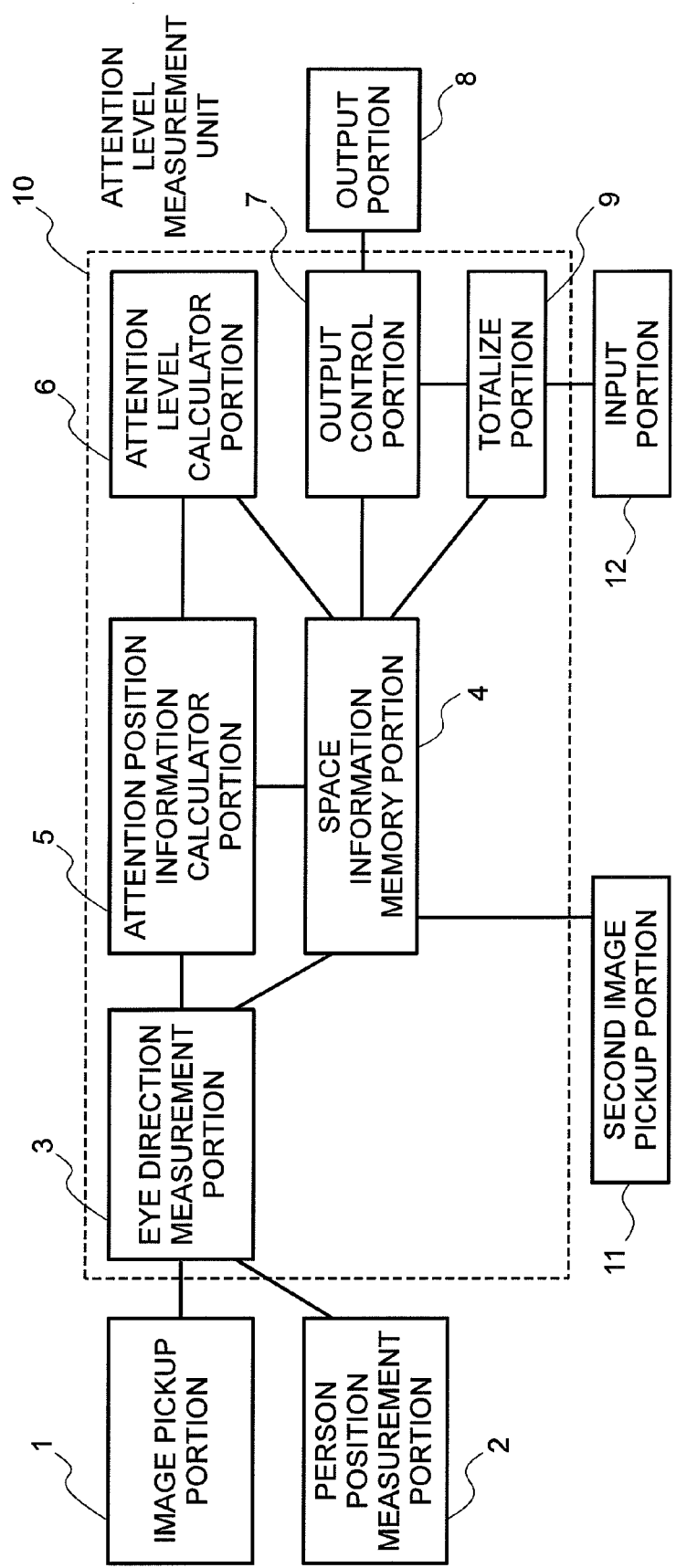
FIG. 1 is a block diagram for showing an embodiment, according to of the present invention.

Hereinafter, embodiments according to the present invention will be fully explained by referring to the attached drawings. However, it is assumed that the constituent elements attached with the same reference numerals have the functions similar to those.

Embodiment 1

FIG. 1 shows the structures of a first embodiment, according to the present invention.

First of all, photographing is made on a person in a space through an image pickup portion 1, thereby to obtain a picture. Next, within a person position measurement portion 2, the position of the person is measured in the space. The image pickup portion 1 and the person position measurement portion 2 are connected to an eye direction measurement portion 3. In this eye direction measurement portion 3, the person is detected among from the picture obtained through image pickup portion 1, and the eye direction is measured, thereby determining the position of an eye direction vector from the position of the person, which is obtained within the person position measurement portion 2. Further, within a space information memory portion 4 is stored, in advance, information of the position, i.e., where the measuring target of attention level lies, such as, an article of commerce, etc., in the space, and it has a function of memorizing the attention level with respect to the measuring target of attention level. Within an attention position information calculator portion 5, the eye direction vector is determined from the direction of eye direction in the space and the position of person, which are obtained from the eye direction measurement portion 3, and determines the attention position from the space information, which is obtained from the space information memory portion 4. Upon receipt of the information of this attention position, an attention level calculator portion 6 calculates the attention level, to be memorized within the space information memory portion 4. Next, within an output control portion 7, an output is provided in the form of a table or a picture, to be outputted to an output portion 8. In the output portion 8 outputs the output information obtained form the output control portion 7, in the form of displaying or printing, etc.

Also in the similar manner, as is shown in FIG. 1, a second image pickup portion 9 may be connected with the space information memory portion 4, so as to pick up a picture of, such as, the measuring target of attention level, for example, and thereby to be used for producing output information thereof.

However, although the present embodiment is shown by the structures in the form of a block diagram of FIG. 1, for the purpose of convenience, but it should not be restricted to this. Thus, the image pickup portion 1 may be connected with the attention position information calculator portion 5, the attention level calculator portion 6, the space information memory portion 4, the output control portion 7, etc., but not through the eye direction measurement portion 3. Or, the second image pickup portion 9 may be connected with, not the space information memory portion 4, but the output control portion 7.

Hereinafter, detailed explanation will be made on each of the elements building up the block diagram of FIG. 1.

(Image Pickup Portion)

The image pickup portion 1 is a camera, and has a function of transmitting a picture photographed, through a bus, LAN (Local Area Network) or the like, to the eye direction measurement portion 3. The image pickup portion may be made from one (1) or more of the cameras.

(Person Position Measurement Portion)

The person position measurement portion 2 has a function of measuring the position of a person lying within an arbitrary space. As an embodiment of this person position measurement portion, there may be a plural number of means, such as, a distance sensor with using infrared rays, a stereo camera, a camera provided on a ceiling or the like, for obtaining a picture looking down therefrom. In case of using the stereo camera, the picture obtaining through the stereo camera can be used as an input picture, as it is, and then it is possible to consider the person position measurement portion 2 to be the image pickup portion 1.

(Eye Direction Measurement Portion)

Within the eye direction measurement portion 3, video processing is conducted on the picture receiving from the image pickup portion 1, so as to measure the direction of a face and eyes of the person in the picture. Further, measurement is made also on the direction of a body of the person in the picture, and upon basis of those data, a final eye direction is determined for the person. Hereinafter, this will be explained.

First of all, explanation will be made on a method for measuring the direction of the face and the eye direction. With using the method, which will be mentioned below, it is possible to measure the eye direction with high accuracy, for a person who appears in the picture arbitrarily.

Figure 2:
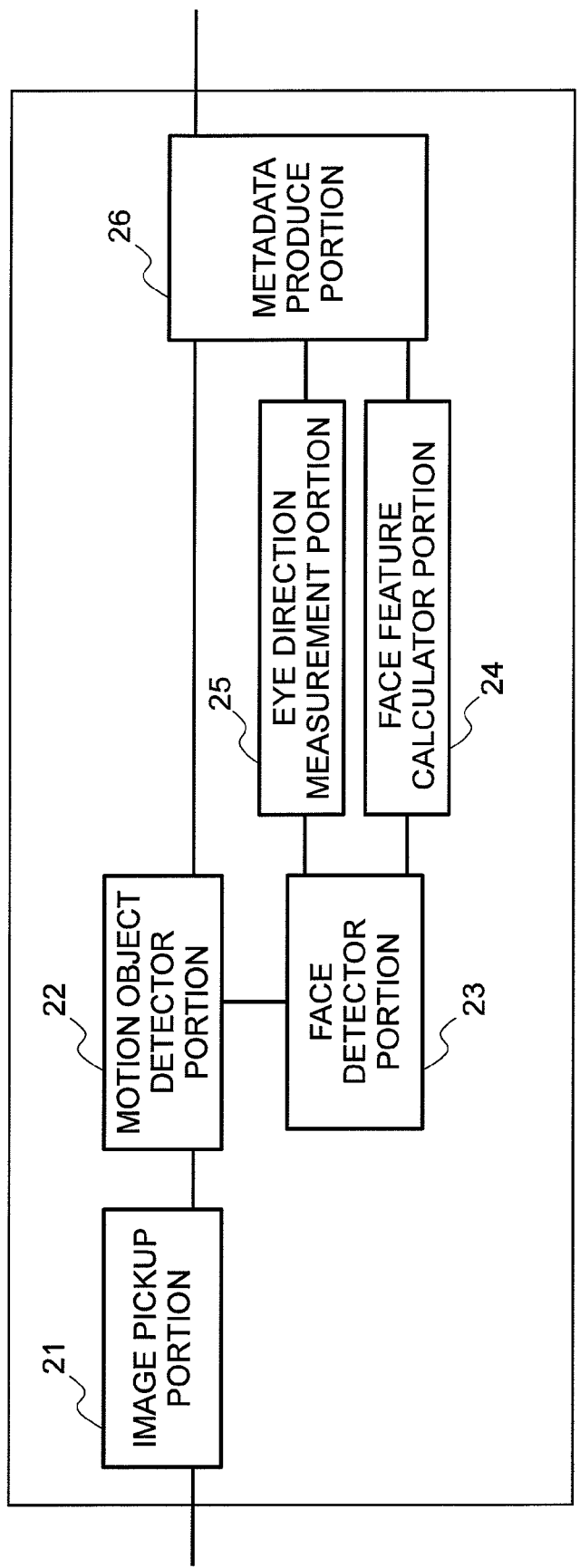
FIG. 2 is a block diagram for showing an embodiment of an eyes direction measurement portion.

The eye direction measurement portion 3 has such the structures as shown in FIG. 2, for example. For example, it comprises a picture obtain portion 21, a motion object detecting portion 22, a face detector portion 23, a face feature calculator portion 24, an eye direction detector portion 25 and a metadata producer portion 26, as the constituent elements.

The picture obtain portion 21 obtains the picture from the image pickup portion 1, for each frame. From a camera number and time information, etc., of the picture obtained, a unique frame ID is produced, and this is written into a header of the picture, so as to make management thereof. The picture obtain portion 21, having a data storage buffer, stores the pictures for a several number of frames within the buffer, until when an obtaining request arrives from the motion object detecting portion 22.

Also, for example, in case where the person position measurement portion 2 is made from the image pickup portion, the video data mentioned above may serve as the person position measurement data, in common. In case where the person position measurement portion 2 is made from the distance sensor, the person position measurement data may be sent to the motion object detecting portion 22, directly, but bypassing the picture obtain portion 21.

The motion object detecting portion 22, obtaining the picture from the picture obtain portion 21, and further obtaining the person position measurement data from the person position measurement portion 2, detects the motion object within the picture, upon basis of those. In this instance, by using the position information of the person, which is obtained in the person position measurement portion 2, it is possible to determine a range where the person lies in the picture. For this reason, it is possible to separate her/him even if a plural number of persons overlap one another, correctly, and so on; i.e., it is possible to conduct the detection of the person, at much higher speed.

Next, the motion object detecting portion 22 attaches a unique motion object number onto the motion object detected, so as to trace it for every frame. For example, when detecting the motion object having size similar to that at a position near thereto, on the next frame, then it is considered to be the same motion object, and it is attached with the same motion object number, to be managed with. Or, for example, once when doing frame out, it is assumed that the trace is ended, at that time, then other number is attached onto the next motion object, so as to manage it. However, determination of the identity of the motion object should not be restricted only to the method mentioned above, but it may be embodied through comparison between results of measurements on the face characteristics, after measurement thereof, which will be explained hereinafter. Thus, the management can be made by considering those similar to each other on the face characteristics to be the same motion object, to be attached with the same motion object number, while others not similar on the face characteristics to be the other motion object, to be attached with other motion object number. The motion object number for each frame and the area information where the motion object presents, which are set up in the above, are transferred to the metadata producer portion 26.

Figure 3:
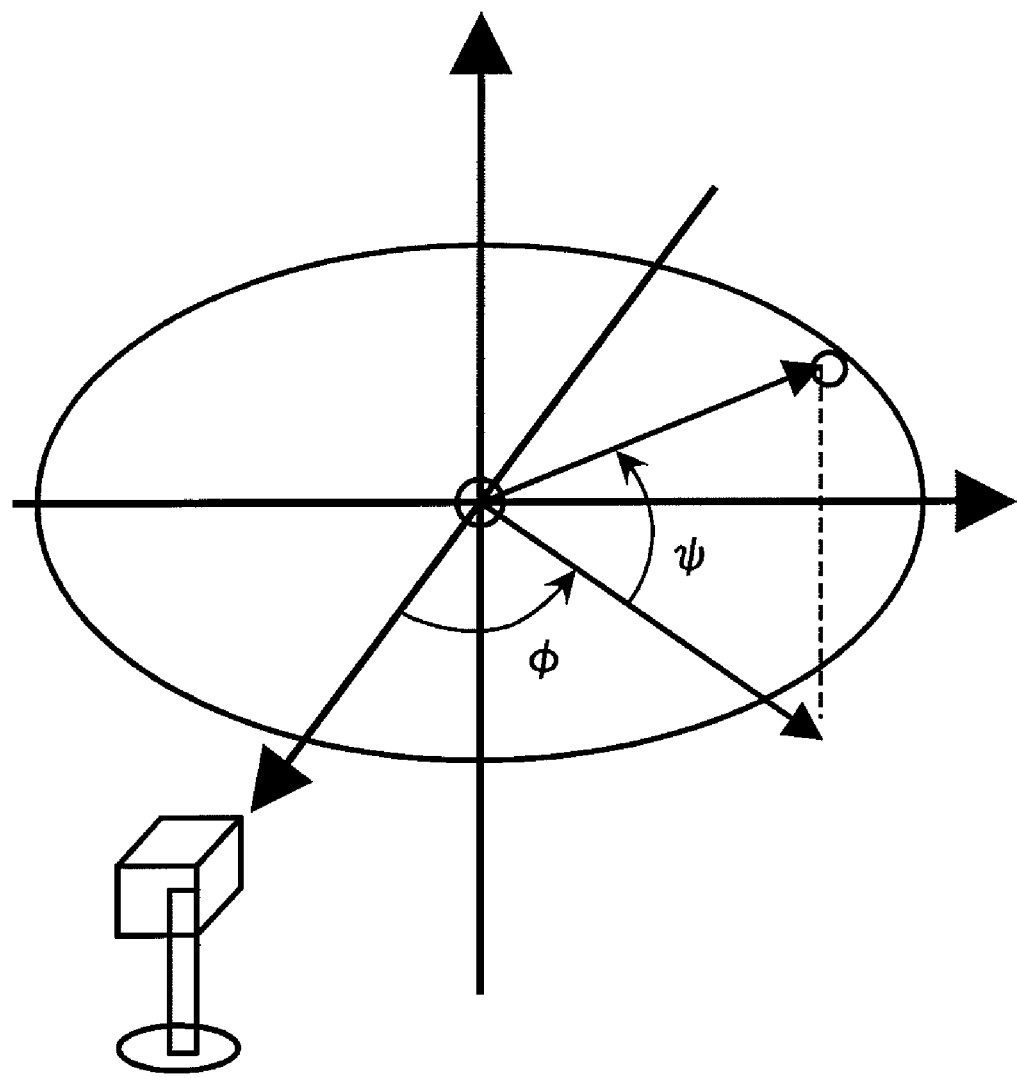
FIG. 3 is a view for explaining an example of directions given by an eye direction and a face direction.

Next, the face detector portion 23 detects a face, with using an already existing methodology, among from the motion object area or region, which is obtained within the motion object detecting portion 22. Only when the face is detected within the face detector portion 23 are executed the processes therein, i.e., the calculator portion 24 and the eye direction detector portion 25. In the face feature calculator portion 24 are calculated face features, with using an already existing methodology, from the face picture, which is detected in the face detector portion 23. The face features obtained are transferred to the metadata producer portion 26. In the eye direction detector portion 25, the face direction and the eye direction are calculated from the face picture, which is detected within the face detector portion 23. This directional information is that, such as, of inclining by φ degree in the horizontal direction and by φ degree in the vertical direction, for example. Thus, as is shown in FIG. 3, assuming that the direction into which the camera is directed φ=0 and φ=0, the right-hand side directing thereto is the position φ direction, and the upper side directing thereto is the positive φ direction. And, it is assumed that the horizontal/vertical components of the face direction are φ face and φ face, and that the horizontal/vertical components of the eye direction are φ eye and φ eye, respectively. It is also assumed; detection of this eye direction is conducted through the conventional technology or an eye direction detecting method, which will be introduced below. In the metadata producer portion 26, various information, such as, a frame ID 30a, which that frame picture has, a camera number 30b, detection time 30c of the picture, a motion object number 30d, which is transmitted from each detector portion, a motion object area 30e, face area information 30f, face features 30g, a face direction 30h, and an eye direction 3i, for example, are gathered into one (1) piece of frame information 1, as shown in FIG. 4, and it is transmitted to the attention position information calculator portion 5 and/or the space information memory portion 4, etc. In case when no motion object is detected in the motion object detecting portion 22, then the metadata producer portion does not any process therein.

(Eye Direction Detecting Method)

Herein will be mentioned an example of eye direction detection according to the present embodiment. Such the eye direction detector portion 25 measures the face direction, first of all, from the face picture obtained in the face detector portion 23, and determines the eye direction with using the face direction information obtained.

(Face Direction Presumption)

Figure 5:
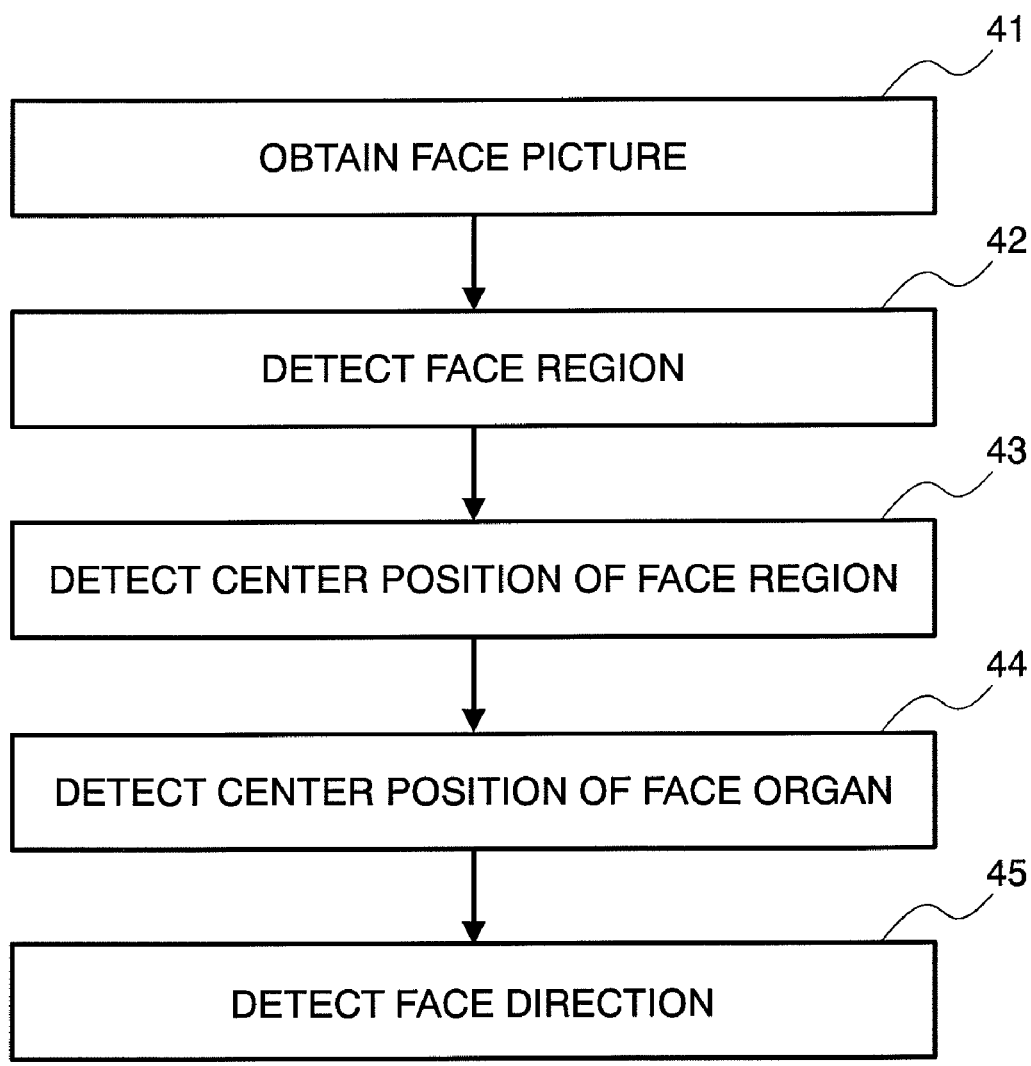
FIG. 5 is an example of flowchart for presuming the face direction.
Figure 6:
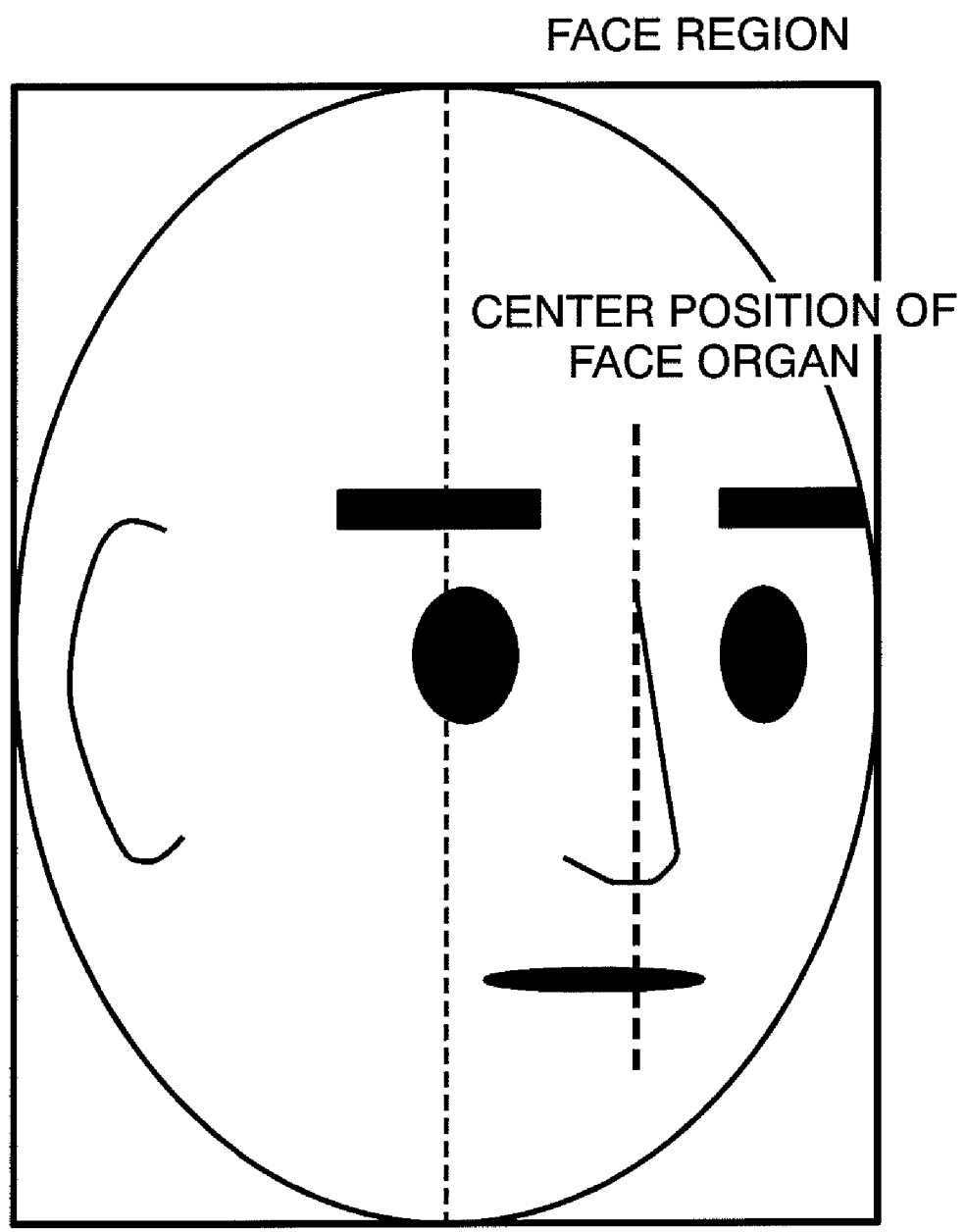
FIG. 6 is a view for showing an example of definition of a face region and a center position of face organ on the picture of a face.

In accordance with the flow shown in FIG. 5, the face direction is detected upon basis of the face information, which is obtained from the face detector portion 23. In a step 41, first of all, the face area information and the picture are obtained from the face detector portion 23. Next, in a step 42, the face area is presumed again, precisely or accurately, through background differentiation and/or skin color extraction, etc. Herein, the face area means a circumscribed rectangular or square area on a head portion, as is shown in FIG. 6. A central position of this face area is called by a face area central position, and this position is determined in a step 43.

Figure 7:
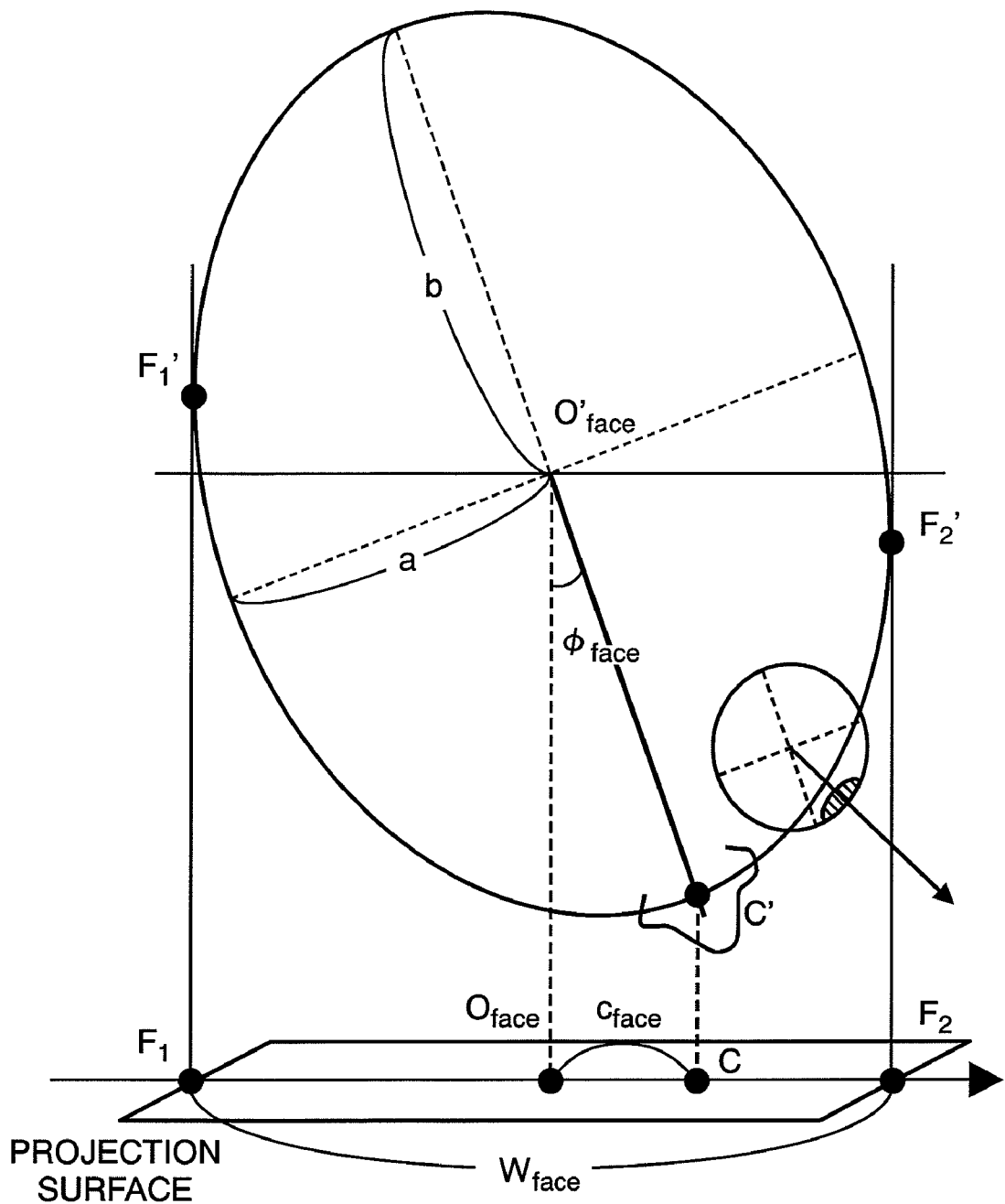
FIG. 7 is a view for showing an example of a face model for presuming the face direction.

Next, in a step 44, detection is made on a face organ center position. The face organ center position means a position of the line, i.e., passing through a center between the both eyebrows, the bridge of the nose, a recess portion of rips, as shown in FIG. 6, for example. This face organ center position can be presumed from a positional relationship of various organs, such as, the eyebrows, the corners of eyes, the nose, for example, after detecting thereof. The various organs on the face can be detected through an already existing methodology, i.e., using a picture, obtained through digitizing the face picture by brightness values, an edge picture, and a picture obtained with treating a separability filter, etc. In a step 45, the face direction in the horizontal direction is calculated from the face area and the face organ center position, which are obtained in the step 45. This can be determined with an equation, by taking a face ellipse model shown in FIG. 7 into the consideration thereof. FIG. 7 shows an image when looking down a head right over, when it turns to φ face in the right direction on the horizontal direction. In this instance, both ends of the face area within the picture are F3Of2, respectively, and the face organ center position is C. In this instance, the central position of the face area lies at the center position Oface of the ellipse, and it is at the middle point between F1 and F2. wface is width of the face area, and it is the distance between cface and Coface. Assuming that a ratio between the width "a" and the length "b" in the direction of depth on the face is a face ellipse ratio "k", then the face direction φ face can be obtained by the following equation:

$$\phi_{face} = \sin^{-1} \frac{c_{face}}{(w_{face}/2 - |c_{face}|)k + |c_{face}|} \quad \text{(Eq. 1)}$$

In the present system, the ellipse ratio "k" is assumed to be about 1.25. This is a value of an averaged head ellipse ratio, measured from statistic data of human being. The value of this "k" differs a little bit depending on the person, however the difference lies within a region being equal or less than 0.1, and therefore an ill influence on accuracy of the face direction due to this comes within an allowable region, in the present system. Depending on the system configuration, not using such the predetermined value as was mentioned above, but this face ellipse ratio "k" maybe obtained, actually. In accordance with the present methodology, it is possible to determine the face organ central position, only by using such the nose, for example, that can be easily detected, even when it is difficult to detect the organs each because the image pickup portion is provided in an upper direction; therefore, it is possible to presume the face direction with high accuracy. And, it is also possible to presume the face direction when it turns sideways, not the face organ central position, but using the position of ears. Regarding presumption of the face direction angle in the vertical direction, φ face, it can be obtained with using the already existing methodology.

(Eye Direction Detection Method)

Figure 8:
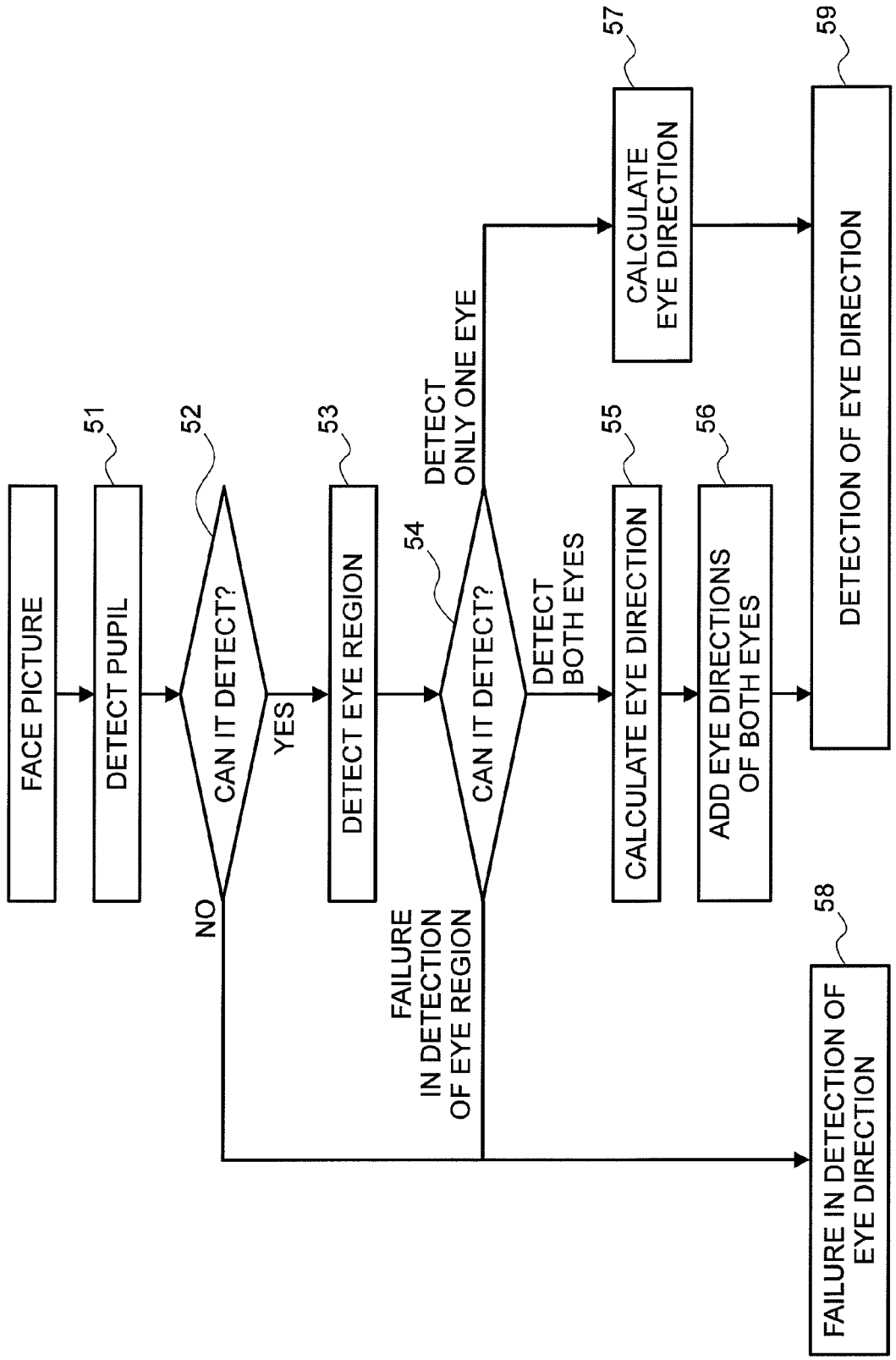
FIG. 8 is an example of flowchart for showing the processes for presuming the eye direction.

With using the face direction information obtained with the method mentioned above, detection is made on the eye direction. This is conducted along with flows shown in FIG. 8. In a step 51, first of all, detection is made on the central positions of the pupils from among the face picture. In a step 52, it is determined on whether the pupil detection is succeeded or not. In case when the pupil detection is failed on both sides, i.e., in failure of detection of eye direction, it is displayed that measurement is impossible in a step 58, and then the process is ended. When detection is succeeded on one side or on both sides of the eyes, then the process advances into a step 53. In the step 53, an eye region is obtained, respectively, to which the pupil belongs to, upon basis of the pupil position obtained in the step 53. A step 54 is a conditional branch point in accordance with the eye region detected in the step 53. Thus, in case when the eye region cannot be detected correctly, detection of the eye direction is in failure. When enabling to detect the eye regions for both eyes, correctly, then the process advances into a step 55, or when only the eye region for only one side, then it advances into a step 57. In the step 55 or 57, calculation is made on the eye direction from the central position of the pupil and the eye region. In the step 57, the eye direction is calculated only for one side of the eyes, but for the both eyes in the step 55. The eye directions of both eyes obtained in the step 55 are unified within a step 56, and the eye direction is detected in a step 59.

Figure 9:
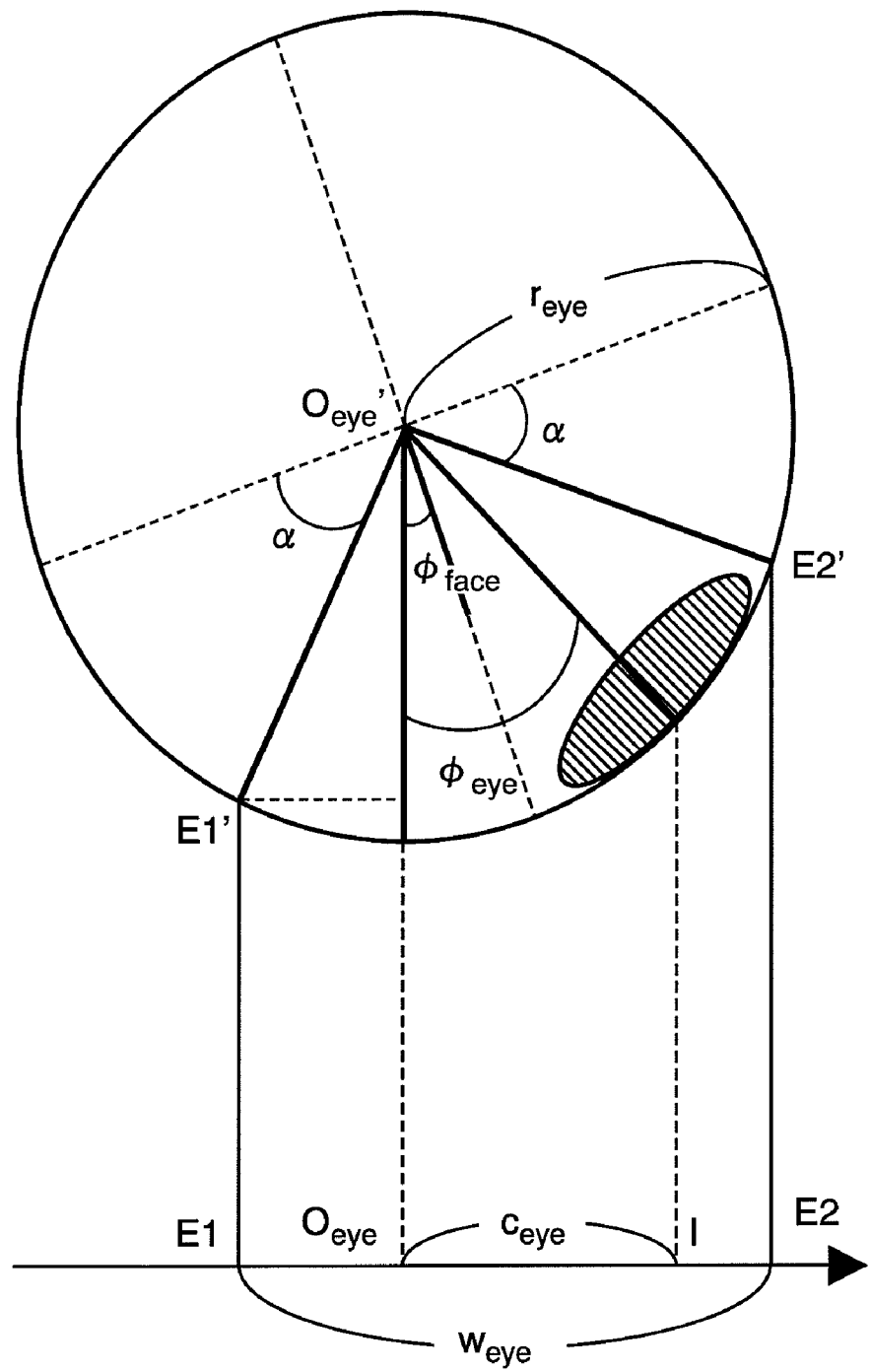
FIG. 9 is a view for showing an example of an eyeball model for conducting presumption of the eye direction.

The method for calculating the eye direction, which is executed in the step 55 and the step 57, will be mentioned below. This is calculated by an equation upon basis of an eyeball model shown in FIG. 9, with using the face direction, the pupil position(s), which is obtained in the step 51 or the step 53, respectively, and the information of eye region. Since the eyeball is covered with a skin, the eye region actually appearing on the picture is only a portion of the horny coat. This is an arc portion E3Oe2 in FIG. 9. It is assumed that the positions of E1 and E2 lie at that of an angle α from the horizontal lines of the respective eyeballs. In FIG. 9, Oeye and I are the central portion of the eyeball and the central position of the pupil, respectively, on the picture, and Oeye' is the actual center of the eyeball. φ face is an angle of the face direction obtained through the face direction detection mentioned above, φ eye is an angle of eye direction, weye is the width of the eye region within the picture, and ceye the length between the eyeball center position and the pupil center position on the picture. In this instance, the eye direction φ eye is determined by the following equation:

$$\sin\phi_{eye} = \frac{2\cos\phi_{face}\cos\alpha}{w_{eye}}(I - E_1) - \cos(\alpha + \phi_{face}) \quad \text{(Eq. 2)}$$

Where, an angle α of a hidden portion of the eyeball is assumed to be at a predetermined value.

However, in the Eq. 2, ceye is indicated by I-E1. This is also same in Eq. 3 and Eq. 4, which will be mentioned later.

Figure 10:
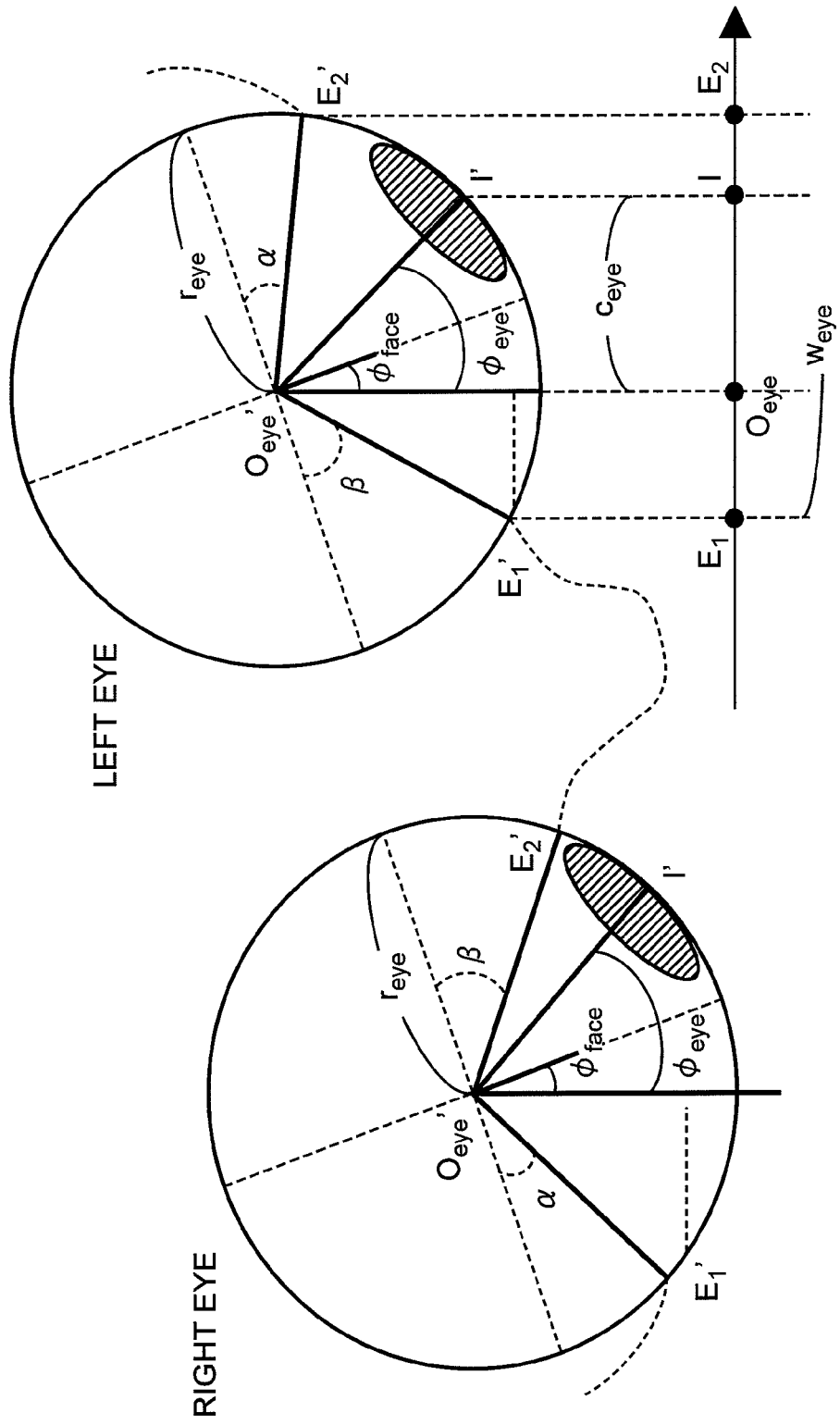
FIG. 10 is a view for showing an example of the eyeball model for conducting presumption of the eye direction.

Also, the eye direction maybe calculated, upon an assumption that the angle of the hidden portion of eyeball differs from, on a central side and an outer side of the face. In this case, the eyeballs on both eyes are as shown in FIG. 10. Thus, it is assumed that an angle of the hidden portion is β on the central side of the face, and α on the outer side thereof. Establishing equation in the similar manner to the Eq. 2, then the equation differs from between the eye on the left-hand side and eye on the right-hand side. The eye direction φ eye of the eye on the left-hand side can be obtained by the following equation:

$$\sin\phi_{eye} = \frac{(I - E_1)\cos(\alpha - \phi_{face}) + (I - E_2)\cos(\beta + \phi_{face})}{w_{eye}} \quad \text{(Eq. 3)}$$

In the similar manner, the eye direction φ eye of the eye on the right-hand side can be obtained by the following equation:

$$\sin\phi_{eye} = \frac{(I - E_1)\cos(\beta - \phi_{face}) + (I - E_2)\cos(\alpha + \phi_{face})}{w_{eye}} \quad \text{(Eq. 4)}$$

Where, for the hidden portions α and β of the eyeballs, predetermined values are used (for example, α=33 degree, and β=40 degree). This may be presumed from the value of a radius of a general eyeball and the value of position of the eye region on the picture, etc.

After measuring the eye directions on both eyes in the step 55, weighting calculation is conducted on the eye directions on both sides in a step 56 to be added, thereby determining the final eye direction. The weighting is determined depending on the face direction. Thus, since the eye on the right-hand side hardly appears on the picture in case when the face turns to the right-hand direction, the weighting factor is increased for the left eye, i.e., the eye direction information of the left eyes comes to be a main eye direction. In case when the face turns to a front, the eye directions are averaged between both eyes. However, determination of the eye directions of the both eyes is conducted, separately, in the vertical direction and the horizontal direction, respectively in relation thereof.

Figure 11:
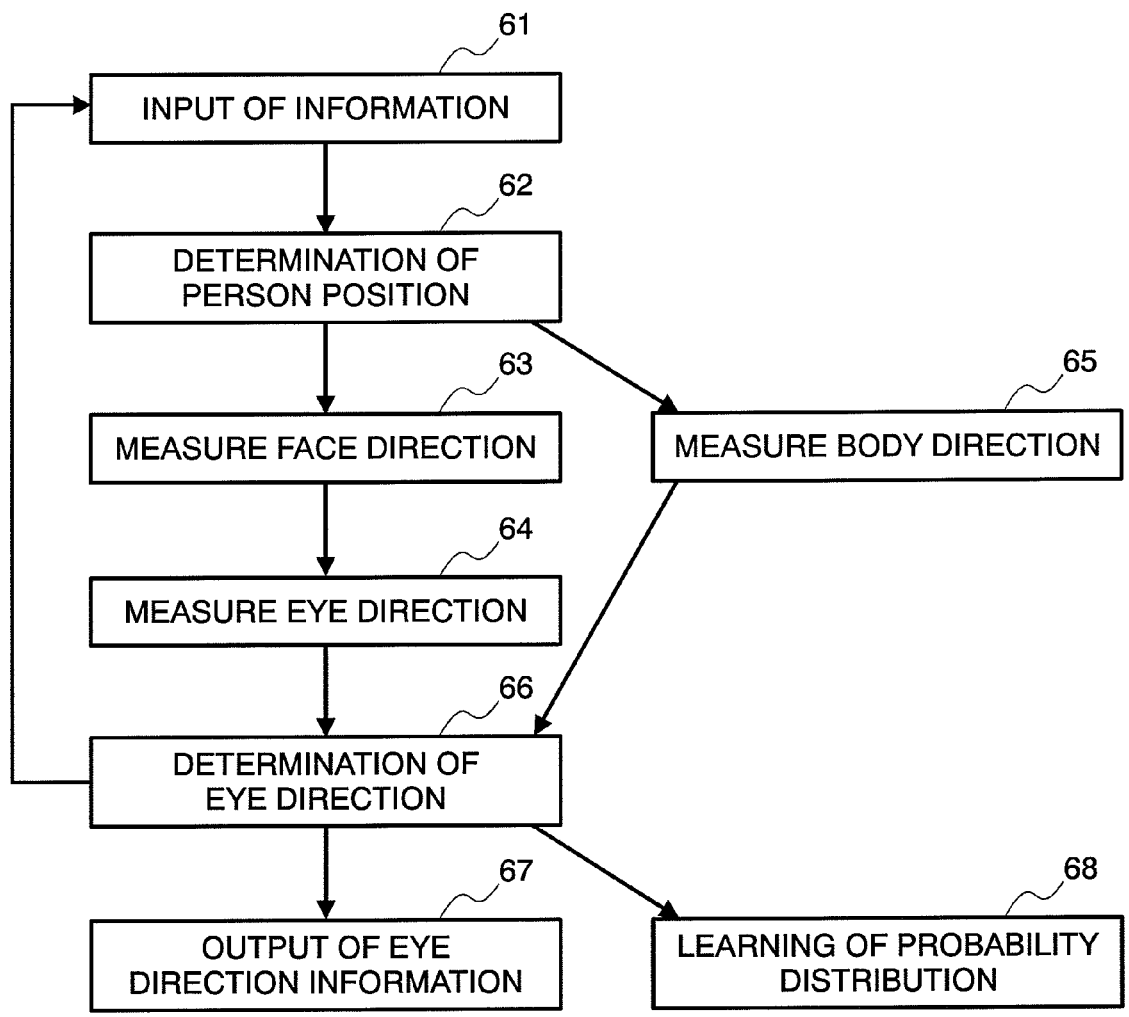
FIG. 11 is a flowchart for showing the flow of processes within an eye direction measurement portion.

With using the direction of the face and the eye direction, which are measured in accordance with the explanation mentioned above, the eye direction measurement portion 3 determines the final eye direction along with a flow show in FIG. 11. Explanation will be made on this, below.

First of all, the picture obtained within the image pickup portion 1, the results measuring upon pictures of the previous frames (such as, the information relating to the position and the eye direction of the person, etc., for example), and the position information of the person obtained in the person position measurement portion 2 are inputted in a step 71. Upon basis of the information of the person position in the previous frame and the present person position, in a step 72, determination is made on the person position within the picture of the present frame. However, when newly detecting a person who does not appear in the pictures until the previous frame, this information is transmitted to the space information memory portion 4, thereby memorizing a sum total of the persons who pass through the space therein.

Next, the face direction is measured in a step 73, and the eye direction in a step 74. In this instance, in case when the measurement cannot be made, such as, when no eye appears on the picture, for example, an output is provided that measurement is impossible. The details thereof are as was mentioned in the above.

In a step 75, measurement is made on the direction of a body of the person appearing on the picture. This is measured by detecting a shoulder line of the person from the picture, or by obtaining a moving direction from changes of the position information of the person on several pieces of frames in the past.

Next, in a step 81, the eye direction is determined from the information, such as, the face direction, the eye direction, and the direction of body, for example. In case when the eye direction can be measured in the step 75, determination is made on whether the eye direction is correct or not, which is obtained upon basis of the information of the direction of body and the direction of face. Also, in this instance, it is so set up that a presumable measurement error distribution can be given on the eye direction obtained, depending on the resolution of a portion of the face in the picture. With the above mentioned, it is possible to obtain two (2) pieces of data, i.e., the eye direction of a person and the measurement error distribution thereof.

On the other hand, in case when it is impossible to measure the eye direction in the step 75, the eye direction is presumed from the face direction and the body direction, to use this as the eye direction. This is determined with using the relationships in the respective directions and the probability density distribution in the eye direction. With the above mentioned, in this case, it is possible to obtain two (2) pieces of data, i.e., the eye direction of the person and the probability density distribution thereof.

Herein, explanation will be made about the measurement error distribution and the probability density distribution.

Figure 12:
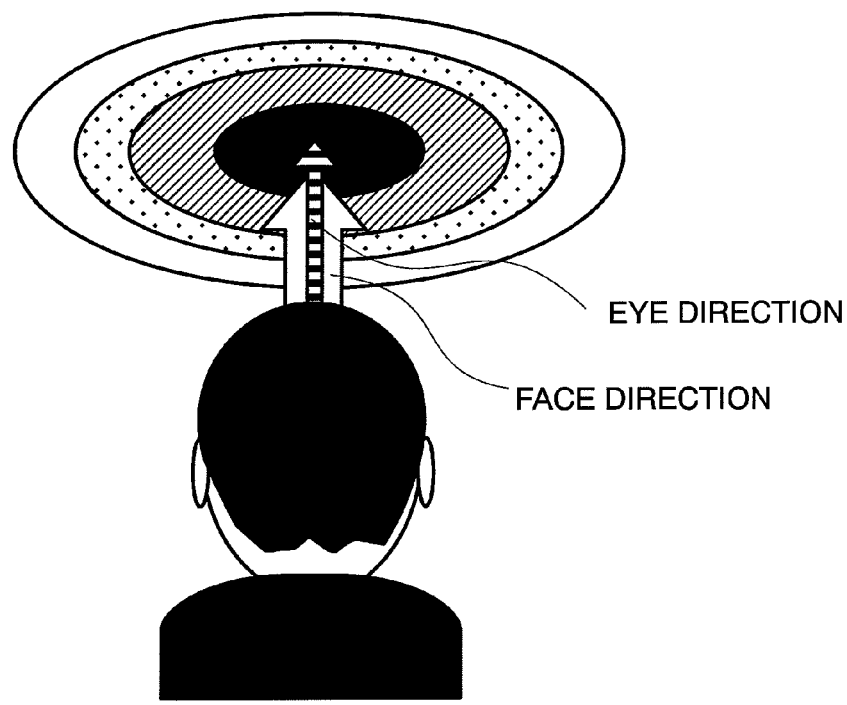
FIG. 12 is a view for showing an example of the eye direction and the face direction, as well as, a probability distribution in the eye direction.

First of all, an example of the measurement error distribution is shown in FIG. 12 attached. The measurement error distribution is the distribution of probability of the eye directions, which is set up by taking the errors on the eye directions measured in the eye direction measurement portion 3 into the consideration thereof. In FIG. 12, the depth of color represents a magnitude of the probability in the eye direction. The measurement error distribution can be considered a distribution around the eye direction measured. By taking this distribution into the consideration, it is possible to reflect the measurement error in the eye direction, upon the data.

On the contrary of this, the probability density distribution is indicative of the probability of the eye direction with respect to the face direction. Also, this probability density distribution, i.e., the probability density distribution of the eye direction with respect to the face direction is changed depending on the relationship between the body direction and the face direction.

First, in case when the face direction and the body direction are in the same direction, in general, a human being tries to capture it at a center of the face when looking at a thing. For this reason, it can be considered that the probability density distribution of the eye direction with respect to the face direction comes to be as shown in FIG. 12, being similar to the error distribution of the eye direction. However, in case of the probability density distribution, it is based, not on the eye direction, but on the direction of face. With using this probability distribution, it is possible to presume the eye direction from the face direction, with high accuracy.

Figure 13:
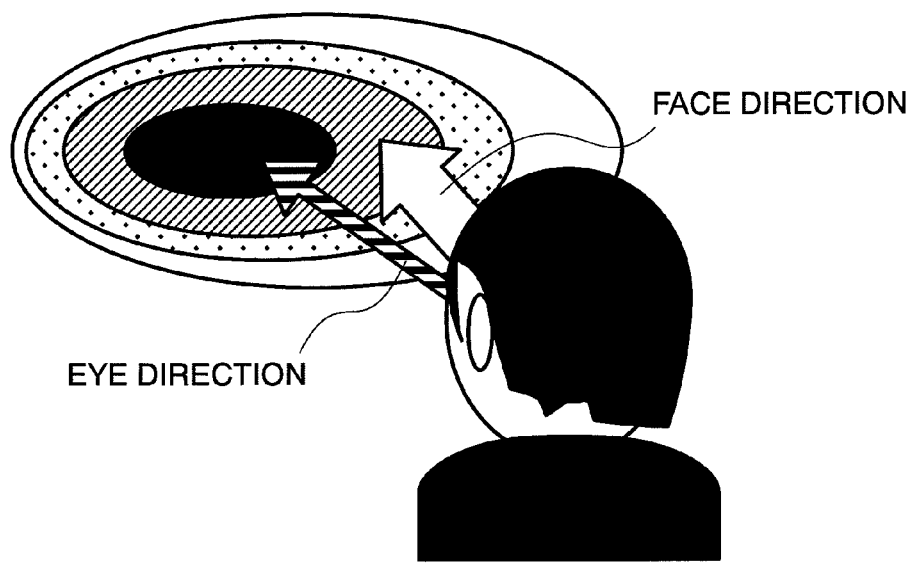
FIG. 13 is a view for showing an example of the eye direction and the face direction, as well as, a probability distribution in the eye direction.

Next, when the human being looks a something in a front obliquely with respect to the moving direction, it hardly occurs that he sees the thing in front of the face, but in many cases the eye direction goes in front of the face direction. For this reason, the probability density distribution is draws, as is shown in FIG. 13, i.e., having a large distribution of probability in front of the face direction. Therefore, by taking also the relationship between the direction of body and the direction of face into the consideration, it is possible to determine the probability distribution, with much accuracy, and thereby to presume the eye direction with higher accuracy.

In any case, it is also possible to select the direction to be the eye direction, being highest in the probability of the probability density distribution.

Herein, in the explanation about the measurement error distribution and the probability density distribution mentioned above, though both of those are explained by referring to FIG. 12, however the distributions of those differ from each other.

For example, it is possible to obtain the probability density distribution, statistically, to be memorized as data, in advance.

Or, for example, it is also possible to establish the probability density distribution depending on an environment of setting up the present system, by sending the respective information to a step 83 when determining that the eye direction, the face direction and the body direction are measured, correctly, in the step 81, thereby to renew the probability density distribution mentioned above through the learning.

As was mentioned above, in the step 81, it is possible to obtain the eye direction, as well as, the measurement error distribution thereof or the probability distribution of the eye direction. Those information and also the person position information within the picture are provided as an output within the picture of the present frame. This is transferred to the step 71, to be used for measurement of the eye direction in the next frame, and at the same time, in a step 82, it is transferred to the attention position information calculator portion 5.

(Space Information Memory Portion)

Figure 14:
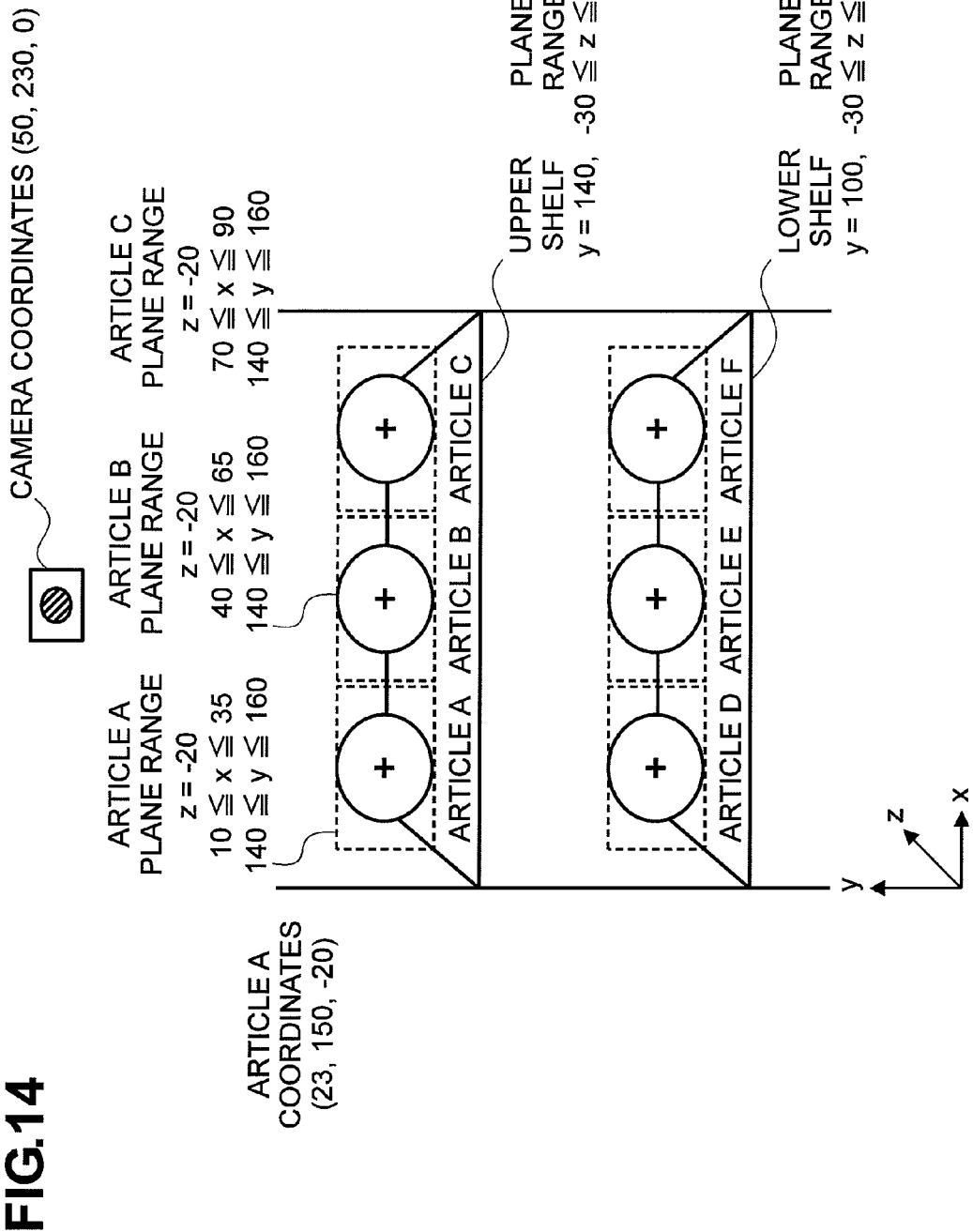
FIG. 14 is a view for showing an example of the position information in a space, which is memorized in a space information memory portion.

Within the space information memory portion 4 is memorized the position information within a space of objects, such as, the image pickup portion 1 and the measuring target of attention level. In more details, this position information indicates a position of a target within the three-dimensional space, in which an origin is set at a certain predetermined point. The position information memorized therein is, such as, equations for expressing planes, which are defined by shelves, a region of coordinates where the commodities are recognized, and the coordinates of a representative point where the commodities are recognized, etc., around the display shelf, as is shown in FIG. 14, for example. In general, it is possible to determine the plane on the space, by the following Eq. 5, or the representative three (3) points on the plane.

$$Az+by+cz=d (a, b, c \text{ and } d \text{ are coefficients}) \quad \text{(Eq. 5)}$$

For this reason, the information for representing a certain plane has this equation, and also respective regions of values for x, y and z thereof. p Also, the space information memory portion 4 has a region for storing the information of attention level, for each one of the attention level measuring targets designated, and also has a function of memorizing the attention level, which is calculated for each of the attention level measuring targets within the attention level calculator portion 6.

In FIG. 14, there is given the following Eq. (6), as the coordinates of the representative point, where a commodity A is located, for example:

$$(x, y, z)=(23, 150, -20) \quad \text{(Eq. 6)}$$

In FIG. 14, the following Eq. (7) is also given, as the region of coordinates where the commodity A is located, for example:

$$Z=-20 (10 \leq x \leq 35, \text{ and } 140 \leq y \leq 160) \quad \text{(Eq. 7)}$$

With other planes, the regions of coordinates thereof are also given by the equations described in FIG. 14.

In this FIG. 14, it is assumed that the person turns to the direction of this paper surface of this figure, to look on the commodity shelf. Therefore, as is shown in this FIG. 14, the plane perpendicular to the direction of the paper surface where the commodities are located may be used to be the coordinates of the plane where the commodity A is located. And, in this instance, by designating regions of values x and y for each commodity, the coordinate ranges are made different from that for other commodity. And example of the coordinate range where the other commodity is located is as shown in the figure. Also, the plane of the shelf shown in FIG. 14 or the like may be used for a setup to shut down the eye direction, as will be explained below.

Also, the space information memory portion 4 holds the information of camera coordinates of the image pickup portion 1, as is shown in FIG. 14.

And also, this space information memory portion 4 may stores the block diagram for expressing the display shelf, and/or the video data of said display shelf, which is photographed by the image pickup portion or the like, associated with or relating to the position information of the each commodity, as is shown in FIG. 14.

Also other than those, such as, the total number of the persons who appears within the picture, which the person position measurement portion 2 measures, etc., may be memorized in the similar manner.

The eye direction measurement portion 3, the attention position information calculator portion 5, and/or the attention level calculator portion 6 can obtain those information from the space information memory portion 4, depending on the necessity thereof.

(Attention Position Information Calculator Portion)

The attention position information calculator portion 5 calculates an attention position from a vector of the eye direction, which was obtained within the eye direction measurement portion 3, as was mentioned above, and the position information of the attention level measuring target, which is memorized in the space information memory portion 4. Or, it conducts calculations, such as, calculating probability distribution of attention position or the like, from the vector distribution of the eye direction, which was obtained within the eye direction measurement portion 3, as was mentioned above, and the position information of the attention level measuring target, which is memorized in the space information memory portion 4. However, the probability distribution of attention position means the above-mentioned measurement error distribution and/or the probability density distribution, etc.

Firstly, explanation will be made on the case when calculating the attention position from the vector of the eye direction.

Figure 15:
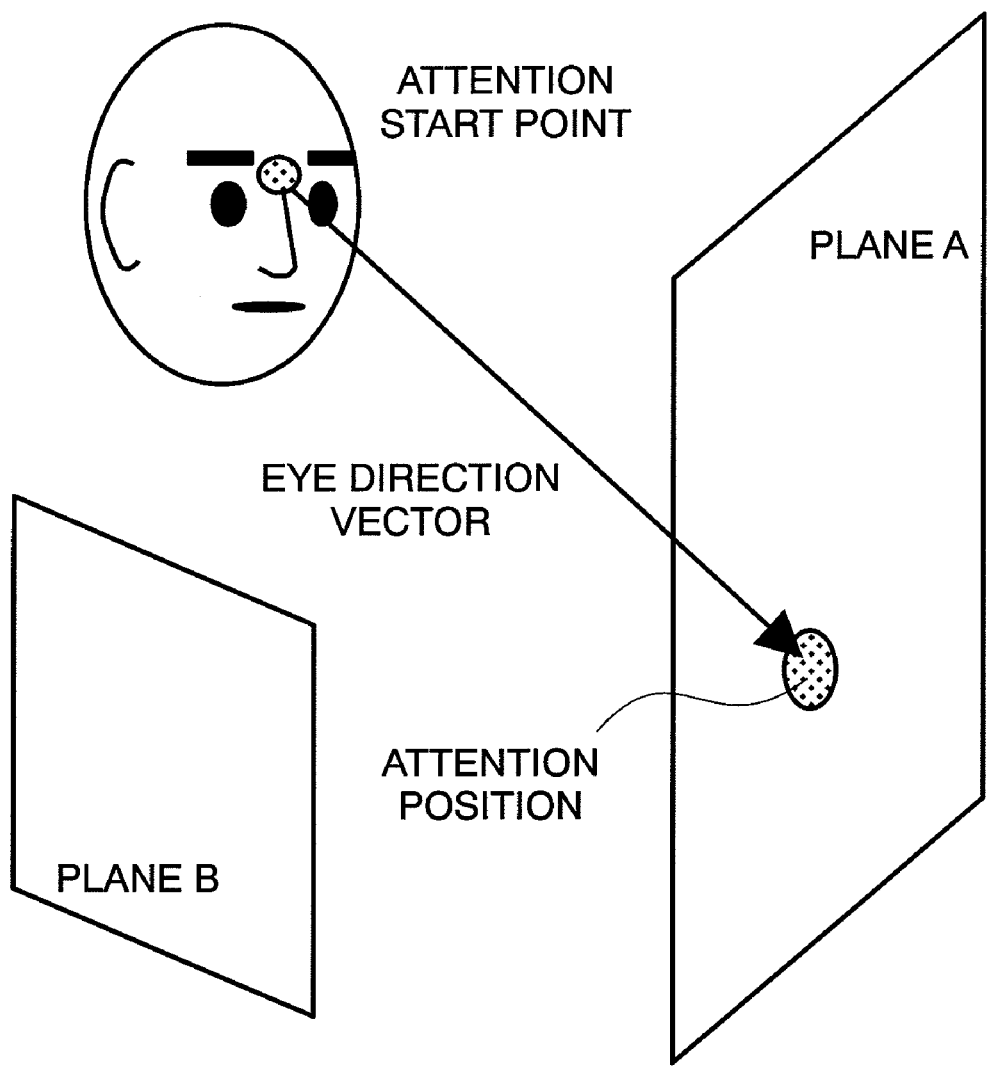
FIG. 15 is a view for explaining an example of the function of an attention position information calculate portion.

The relationship between the eye direction vector and the attention position is shown in FIG. 15. When there are a plane A and a plane B, as the attention level measuring targets, calculations are made for obtaining the intersecting points between the respective planes and the eye direction vector, and thereby determining the position at which the attention is paid on which plane. In an example shown FIG. 15, attention is paid on the plane A, in particular, at the attention position illustrated in the figure.

The attention position information calculator portion 5 calculates out the coordinates of the attention position, in accordance with the processes mentioned above.

Next, explanation will be given on the case when calculating the distribution of attention position probability from the eye direction vector distribution.

Figure 23:
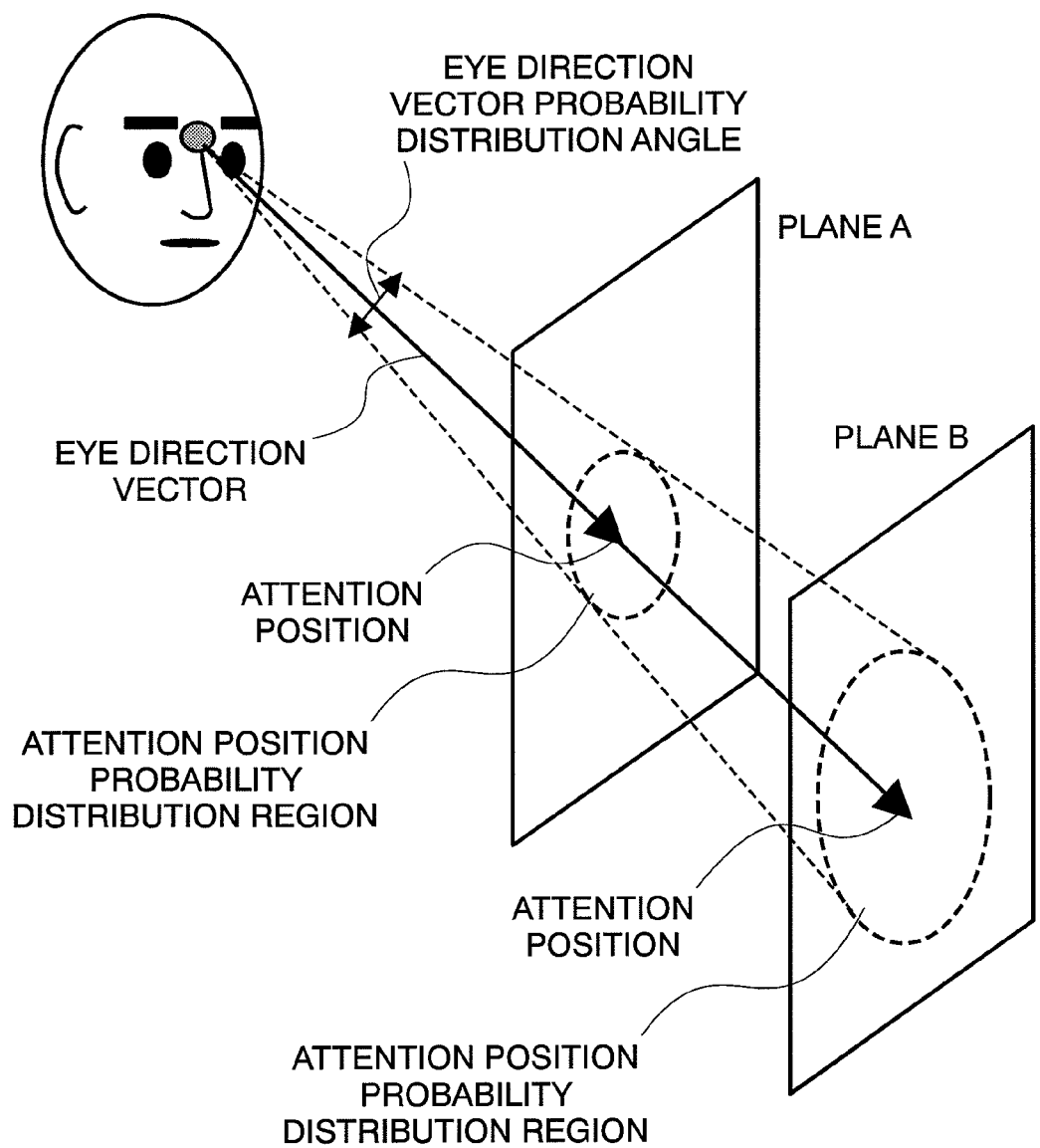
FIG. 23 is a view for showing an attention position and a range of attention position probability distribution.

First of all, FIG. 23 shows an example of calculating out the attention position probability distribution from the eye direction vector distribution. Hereinafter, explanation will be given, including the measurement error distribution mentioned above and the probability density distribution mentioned above into the eye direction vector.

The eye direction vector distribution is the distribution of probability of the eye direction, which is measured in the eye direction measurement portion 3 mentioned above. The eye direction vector, having the probability of eye direction being equal or higher than a predetermined threshold value, with respect to the eye direction measured within the eye direction measurement portion 3, is widen with a certain degree of with of an angle, as shown in FIG. 23.

However, the threshold value is set at such a value, that the probability of eye direction or the probability of attention equal or less than that threshold value can be neglected upon totalizing the attention level. In more details, it is set at 0.01%, 0.1% or 1%, etc., for example.

Therefore, as is shown in FIG. 23, the distribution region of the attention position probability, i.e., the region where the probability distribution angle of the eye direction vector mentioned above intersects the plane of the measuring target of attention level comes to be large, as the position at which the attention is paid is far from.

Figure 24A:
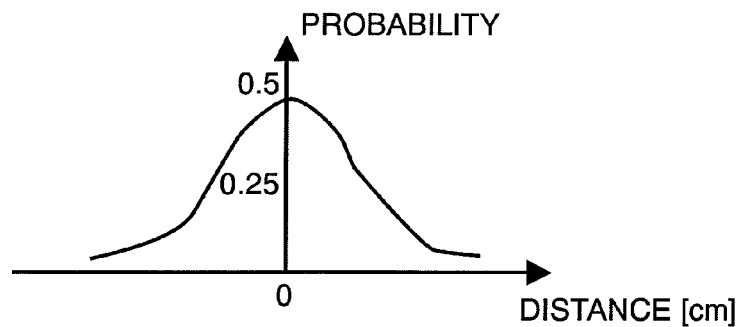
FIGS. 24(a) and 24(b) are views for showing the attention position probability distributions of attention position probability distribution ranges.
Figure 24B:
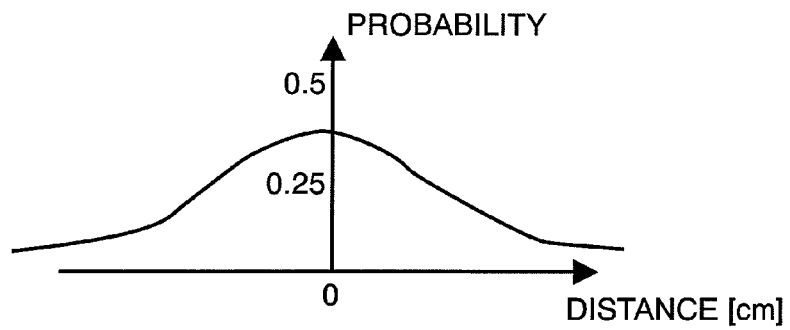

In case where the eye direction vector distribution is the measurement error distribution mentioned above, an actual attention position probability distribution may have a configuration of the Gauss distribution as shown in FIG. 24, for example.

FIG. 24 shows the attention position probability distributions, respectively, on the plane A and the plane B shown in FIG. 23, wherein the horizontal axis indicates the calculated distance from the attention position while the vertical axis the probability that that position be the actual attention position. In the calculation of the attention level, it is assumed to use this probability to be the attention level.

Also, in case when the eye direction vector distribution is the probability density distribution mentioned above, it is not necessary to be the Gauss distribution shown in FIG. 24. For example, it is possible to use general nature of actions of the human being, or a result of learning after observing those. Or, it may be an asymmetry distribution, for example.

Figure 25:
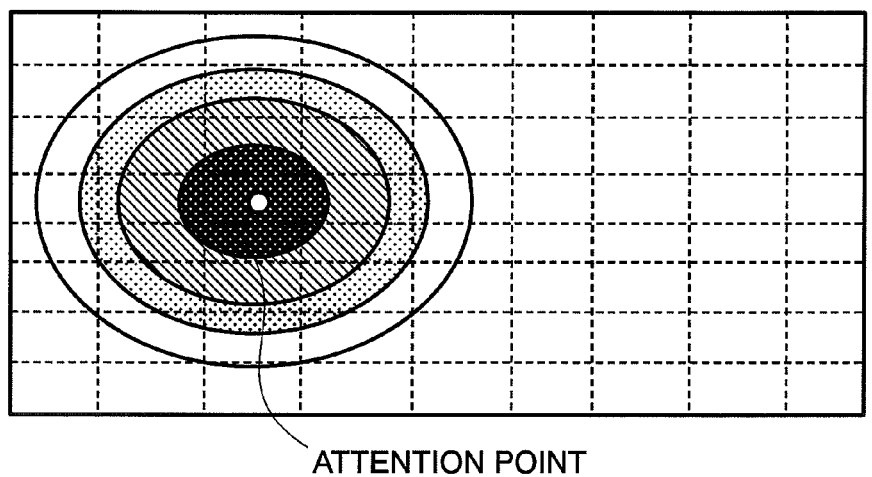
FIG. 25 is a view for showing the attention position probability distributions of attention position probability distribution ranges.

The relationship between the attention position and the attention level distribution on the surface of the measuring target of attention level is as shown in FIG. 25.

The attention position information calculator portion 5 calculates out the attention level distribution on the surface of the attention level measuring target, in accordance with the processes mentioned above.

The attention position information calculator portion 5 transmits the data, such as, the coordinates of attention position obtained through the process mentioned above and the attention position probability distribution on the surface of the attention level measuring target, etc., to the attention level calculator portion 6. In this instance, in case when the attention level calculator portion 6 conducts the attention level calculating process only with the coordinates of the attention position, calculation of the attention position probability distribution on the surface of the attention level measuring target and transition thereof are unnecessary.

Also, in the present embodiment, also the data, upon which the attention position information calculator portion 5 does not conduct calculation process, such as, the position information of person obtained from the eye direction measurement portion 3, the attention position information calculator portion 5 transmit it to the attention level calculator portion 6. However, the data not necessary to pass through such the attention position information calculator portion 5 may be transmitted from the eye direction measurement portion 3 to the attention level calculator portion 6, directly.

(Attention Level Calculator Portion)

Within the attention level calculator portion 6, an attention level is calculated from the position information of the attention position, which is obtained within the attention position information calculator portion 5, or the attention position probability distribution. Herein, it is assumed, as the information of the attention level to each of the commodities are calculated out, such as, an attending time-period, an attention number of times (i.e., a number of times of paying attention), a number of attending persons (a number of persons paying attention), an attention position probability, and an attending method (i.e., a manner of paying attention), etc.

Hereinafter, an example of calculating out the attending time-period, the attention number of times, the number of attending persons, etc., with using the position information of the attentions position or the attention position probability distribution.

First of all, upon determining on whether the person pays attention onto the measuring target or not (hereinafter, being called attention determination), it is determined to in the condition of attending this, for example, when the position coordinates of the attentions position, which is obtained within the attention position information calculator portion 5, are included within the coordinate range where the each article lies, which the attention level calculator portion 6 obtains from the space information memory portion 4.

Next, explanation will be made in relation to counts of the attention number and the number of attending persons, etc. When counting the attention number, for example, the probability is low that the person pays attention with consciousness, if the attention position reaches to the commodity region only within one (1) frame of the pictures photographed.

Then, according to the present embodiment, counting is made on the number of times when continuous attending time-period exceeds a threshold value, as the attending time-period. Also, the persons conducting such the attending action are counted to be the attending person. Herein, it is assumed that the threshold value is one (1) second, for example, and then attention is made for one (1) second or longer than that, then counting is made on the attention number and also the number of attending persons.

Herein, for example, in case when the same person pays attention on the commodity B for three (3) seconds after paying attention on the commodity A for two (2) seconds, and then she/he pays attention on the commodity C only for 0.5 second and thereafter upon the commodity A, again, for four (4) seconds, then the number of the attending persons to be counted of the commodity A comes up to one (1) person, the attention number of times two (2) times, and the attending time-period two (2) seconds and four (4) seconds, i.e., the total attending time-period comes up to six (6) seconds. Also, the number of attending persons to be counted of the commodity B comes up to one (1) person, the attention number of times one (1) times, and the total attending time-period is three (3) seconds. And, the number of attending persons to be counted of the commodity C comes to zero (0) person, the attention number of times zero (0) time, and the total attention number of times zero (0) second.

Although the threshold value is set at one (1) second, for the convenience of explanation, however this may be different from, depending on the environment, in which the system is applied. For example, it is preferable to set the threshold at 0.3 second for attention onto the commodity, etc.

Also, as other method for the attention determination, it is possible to determine with using the attention position probability distribution. In this instance, for example, the determination will be made as below. First of all, the attention level calculator portion 6 makes comparison between the attention position probability distribution, which is obtained within the attention position information calculator portion 5, and the coordinates of the representative point where the commodities lie, which is obtained from the space information memory portion 4, and obtains the attention position probability on the coordinates of this representative point. Next, if this attention position probability is lower than a threshold value, which is determined in advance, then it is determined that attention is paid thereon, on the other hand if it does not reaches to the threshold value, it is determined that no attention is paid thereon.

Also, herein, estimation may be made with using a value of simple integration of the attention position probability as the attention number of times, but without providing such the threshold value as mentioned above. Thus, when the coordinates of the representative point of the commodity overlap two (2) times at the position of 50% attention position probability in the attention position probability distribution, it is possible to set the attention number of times to one (1) time.

Upon calculation of this, it is possible to obtained an averaged time per one (1) time of attention, and also the attention number of times per one (1) person, for example. Further, with memorizing the information of the total number of persons who appear within the picture, it is possible to obtain the attention number of times per one (1) person, etc.

Also, the attending method listed up as one example of the attention level in the above means, in which manner the attention is paid on the attention level measuring target. The attending method includes, for example, an attention paid with turning the body opposite to the attention level measuring target, correctly (i.e., body directing attention), an attention paid with turning only the face into the direction of the target (i.e., face directing attention), and an attention paid with turning only the eye direction to the commodity direction (i.e., eye directing attention),etc. Those are determined by calculating the difference in the direction between the body and the face, the difference in the direction between the face and the eye direction. With this information of the attending method, it is possible to classify the attending method to the attention level measuring target and to calculate the attention level, which is weighted by the attending method.

As other parameters for attention estimation, for example, it is possible to make estimation with applying an estimation function $f(r, t0, t1)$ for conducting integration upon the parameters, such as, the attention position probability and the time, etc., for example. Herein, r is the attention position probability at the coordinates of the representative point, t0 a starting time of the attention level measurement, and t1 an ending time of the attention level measurement.

The information of the attention level obtained in the above is stored into the space information memory portion 4 by the attention level calculator portion 6. An example of the information of attention level to be stored is shown in FIG. 16. For example, a table is prepared for each of the attention level measuring target, such as, the commodity, and there are memorized attention number of times per attending person, the attending time-period per one time thereof, the attending method, the attention starting time, and also other attention level, etc., which was explained in the above. With memorizing the attention starting time therein, it is also possible to calculate a result for each time zone of the attention level. Further, in case of conducting tantalization, such as, when wishing to see the picture of the person attending to that commodity in a certain time zone, for example, it is possible to utilize an index to the picture.

Figure 17:
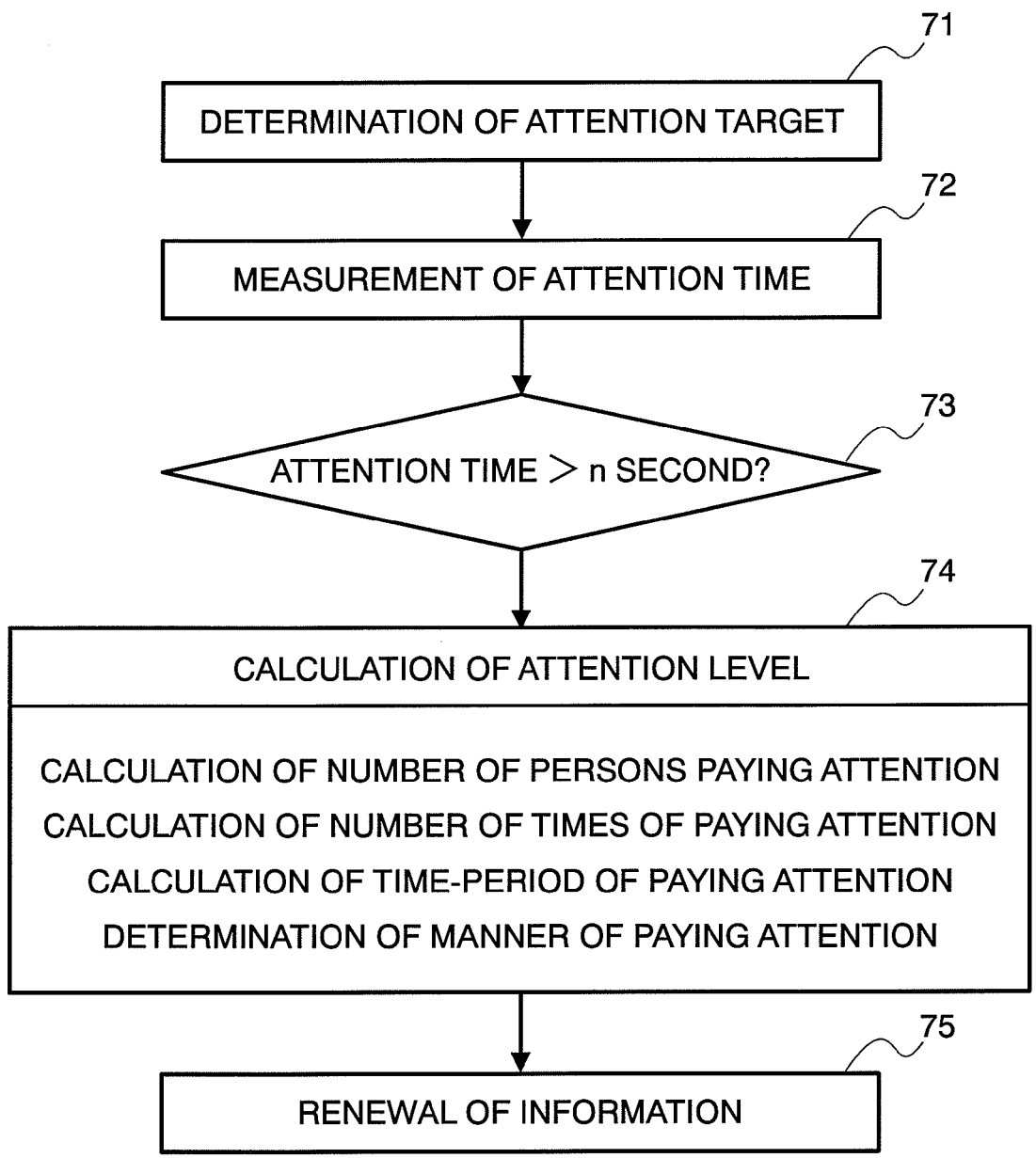
FIG. 17 is an example of flowchart for showing the processes in an attention level calculate portion.

Next, an example of flow of the attention level calculation within the attention level calculator portion 6 will be shown in FIG. 17. Herein, among the methods for calculating the attention level, which are explained in the above, the flow will be explained in the method of using the attention position and the coordinate range where the each commodity lies. Also, in other method for calculating the attention level, the flow is basically same, but differs from, in particular, the respective parameters explained in the above and the method for calculating thereof, when calculating the attention level. First, in the step 71, determination is made on the commodity, on which the attention is paid, from the attention position obtained. The attention determining method is as will be mentioned below.

Next, in the step is made measurement on the attending time-period. In case where the above-mentioned threshold value is set at n seconds, the process advances into the step 74 when the attention is continued for n seconds onto one commodity in the step 73.

In the step 74, calculation is done on the attention information about the commodity, on which the attention is paid. The following calculation is conducted on the parameters of the information portion of the commodity mentioned above, in the table shown in FIG. 16. First of all, determination is made on if the person directing the eye direction is a first one or not, who pays the attention on that commodity, for example, by means of the above-mentioned method for determining the identity of the motion object, etc. For example, when a certain person pays attention onto that commodity, first, then one (1) is added to the number of attending persons, which is memorized in the space information memory portion 4, since she/he is the first person newly paying attention onto the commodity. Also, since paying attention is started newly, the number of times obtained by adding one (1) to the attention number of times, which is memorized in the space information memory portion 4, is made the calculated value of the attention number of times. Also, the attending time-period is measured, from the time point when the attention position enters into the space coordinate range of the commodities up to when it goes out that space coordinate range, and it is stored to be the calculated value of the attending time-period. Next, as was mentioned above, the attending method is determined from the difference between the direction of body and the face direction, and the difference between the face direction and the eye direction.

Finally in the step 75, renewal is made on the information of attention level for each commodity, which is memorized in the space information memory portion 4, with using the calculated values and the determination result of attending method mentioned above.

However, in the present embodiment, such renewal may be made, automatically, at a sampling period or distance of a predetermined time-period. Also, for example, renewal of the number of attending persons and the number of times of attention may be made at the time point when the attention position enters into the space coordinate range, or every time when sampling a passage time from the time point when the attention position enters into the space coordinate range.

In this manner, it is possible to obtain and hold the data relating to the attending time-period, such as, the number of times of paying attention, the number of persons paying attention, etc.

(Totalize Poriton)

A totalize poriton 9 conducts the totalizing of the attention level data, etc., and outputs the information of the totalized attention level, etc., to an output control portion 7.

The totalize poriton 9 totalizes the attention level data, such as, a calculation result, etc., obtained by the attention level estimation function, for example, with using the number of persons paying attention, the number of times paying attention, the time-period of paying attention, or using those as the parameters. Also, those attention level data may be totalized, per a unit of time, separating them into time zones, for each kind of the attending method.

Selection of such the totalizing method may be made upon basis of measurement setup information inputted from an input portion, which is connected with the totalize poriton 9, as is shown in FIG. 1.

This input portion 12 may be connected in an outside of the attention level unit 10 shown in FIG. 1, or in an inside thereof.

Also, an address of sending the measurement setup information by the input portion 12 may be, not the totalize poriton 9, but the output control portion 7, which will be explained below.

(Output Control Portion)

The output control portion 7 converts the information of attention level stored in the space information memory portion 4 and/or the information of attention level totalized by the totalize poriton 9, into a desired format, to be outputted to the output portion 8.

Hereinafter, explanation will be made on data conversion within the output control portion 7, by referring to an example of output at the output portion.

Figure 18:
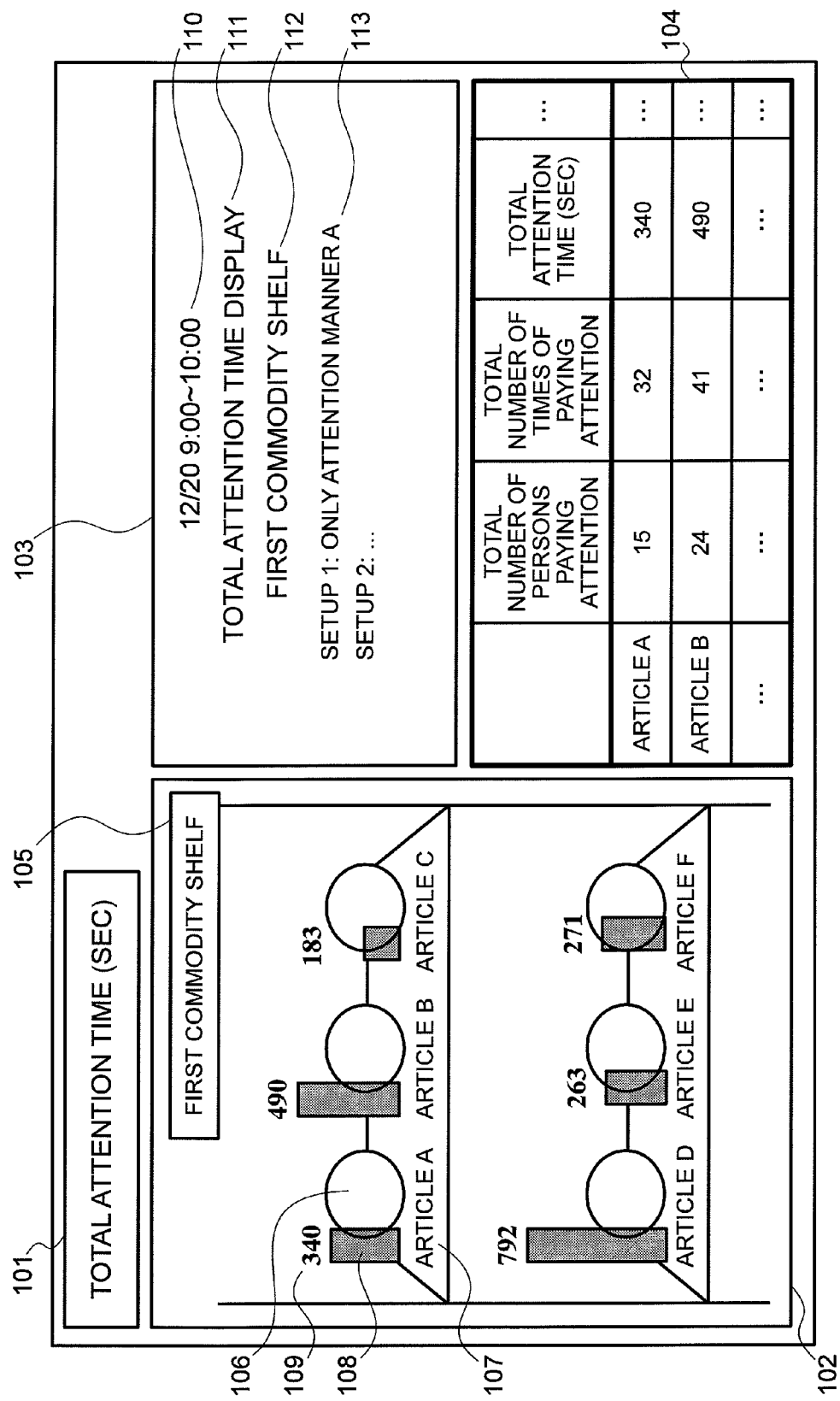
FIG. 18 is a view for showing an example of an output picture produced by an output control portion.

First of all, in case where a monitor is used at output portion 8, CG presenting the measuring target of attention level and/or the pictures of photographing the measuring target of attention level are obtained from the space information memory portion 4, and obtains the information of attention levels totalized from the totalize poriton 9. Next, graphic information of attention level is piled up on a background picture, as is shown in FIG. 18, thereby composing them. With this, it is possible to display the picture of commodity and the information of attention level, associated or related with each other, visually, so that they can be grasped easily.

Herein, explanation will be made on an example of the graphic information to be composed by means of the output control portion 7, by referring to FIG. 18. The present example displays; such as, a title display 101 of the display screen, an attention level information picture display 102, a display 103 of attention level measurement setup, an attention level detailed information display 104, etc. Among of them, those other than the attention level information picture display 102 may be not displayed if there is no necessity thereof.

Next, explanation will be made on the attention level information picture display 102. The present example of display is composed, after producing the CG of the commodity shelf as the background picture, by piling up the picture of the graphic information produced upon basis of the data of attention level, which is totalized in the totalize poriton 9, on this, to be displayed. In the present embodiment, the commodity A is displayed as a model 106, and also an article name in addition thereto. Also, in the present embodiment, applying the total attention time-period therein, a bar graph 108 indicating the value thereof and the value 109 of that attention level are composed and displayed. Not only the bar graph, but also the numerical values thereof maybe displayed, in addition thereto. In this case, there can be obtain an effect that the attention level can be grasped, easily, in particular, quantitatively. Also, in case when there are plural numbers of regions on the measuring target (the shelves in this example shown), or the like, a target display column may be provided as is shown in the figure. With this, it is possible to discriminate the region, which is displayed thereon, in particular, in case when changing over the plural numbers of regions on the measuring target, to be displayed.

Next, explanation will be made on the display 103 of the attention level measurement setup. The display 103 of the attention level measurement setup includes, such as, a display 110 of measurement period, a display 111 of the attention level display method, a display target display 112, and a display 113 of setup, etc. There is no necessity of displaying all of those, but displaying those enable to make confirmation on the setup and/or condition of attention level, etc., in addition thereto, when a user makes analysis on the attention level.

Next, explanation will be made on the attention level detailed information display 104. This attention level detailed information display 104 displays, such as, an information table, as is shown in FIG. 18, for example. With this, it is possible to display the detailed information, which cannot be displayed by means of only the attention level information picture display 102. Displaying this display, at the same time, together with the attention level information picture display 102, it is also possible to confirm the detailed data, simultaneously, with conduction the grasping of the attention level, easily. With this, it is possible to obtain an effect of enabling analysis on the attention level on one (1) display screen, with various kinds of approaches.

In the embodiment shown in FIG. 18, the attention level detailed information display 104 displays thereon, for example, the total number of persons paying attention, the total number of times paying attention, and the total time-period of paying attention, per a commodity within measuring time-period, and thereby providing data for supplementing the attention level display data on the attention level information picture display 102.

Also, in the example mentioned above, the attention level information picture display 102 is separated to specific regions. On the contrary to this, it is also possible to display the attention level information picture display 102 covering over the entire screen, while piling up the title display 101 of the display screen, a target display column 105, the display 103 of the attention level measurement setup, and the attention level detailed information display 104 on the attention level information picture display 102.

Also, when changing the display target of the attention level information picture display 102 to other display target (in the present embodiment, other shelf), it is also possible to change the display contents of the target display column 105, the display 103 of the attention level measurement setup, and the attention level detailed information display 104, in addition thereto. With doing this, it is possible to display the target to be displayed and the data related with linking between them. Such changing of the display is executed, for example, when the output control portion 7 requests necessary data to the space information memory portion 4 and the totalize poriton 9, and when the space information memory portion 4 transmits the data to the output control portion 7 responding thereto. In the similar manner, the totalize portion 9 also transmits the totalized data to the output control portion 7 corresponding thereto, so as to compose it into the picture within the output control portion 7, and it is outputted to the output portion 8.

However, in the example of display shown in FIG. 18, the total attention time for specific one (1) hour is displayed, as an example. On the contrary to this, it, is also possible to renew the data, continuously, accompanying with passage of times, while keeping the period for measuring the attention is constant in the past from the present time. With dosing this, it is possible confirm the changing condition of attention level, for each of newest commodities.

Such edition of the picture as mentioned above is conducted within the output control portion 7, however as the method for obtaining the background picture mentioned above, for example, there is one, which will be mentioned below.

First of all, it is a method of using the picture of the target of paying attention, which is photographed in advance, as the background picture. The picture photographed is stored within the space information memory portion 4. It is possible to use a digital camera, in general, for photographing the target of paying attention. Also, storing the CG picture, which is produced previously, in the manner mentioned above, and it may be used as the background picture. Further, connecting the second image pickup portion shown in FIG. 1 to the attention level measurement unit, it is possible to use the measuring target photographed real-time by this second image pickup portion to be the background picture. In this case, the second image pickup portion is connected with the space information memory portion 4 or the output control portion 7, for example, to be composed with the video information indicating the information of the attention level real-time, by means of the output control portion 7.

For example, by conducting association for making correspondence between the position of the measuring target (i.e., the position in the real space), which is memorized within the space information memory portion 4, and the position on the background picture obtained, it is possible to display the picture of information of the attention level, correctly, at the position of the measuring target within the background picture. In relating to this association, it is possible for the space information memory portion 4 or the output control portion 7 to hold the data for associating the background picture with the position information of the measuring target.

Also, for example, if the background picture is the photograph taken in advance or the CG, or the like, there may be provide an element for inputting that data. Or if the image pickup portion can change photographing region by the functions of zoom, pan, and tilt, etc., then it is possible to set up the information in advance, for example, the position on the space of the image pickup portion, an angle of field of the image pickup portion, zoom, etc. Next, from those setup data and the data of the position information of measuring target obtained from the space information memory portion 4 and the data of the operating condition of the image pickup portion at present, the position of the measuring target is calculated on the background picture, which is photographed at present. With this, it is possible to compose the graphic picture of attention level at the position of the measuring target on the background picture, even when the image pickup portion changes the photographing region thereof.

In case of photographing the measuring target of attention level real-time, when the article displayed on the shelf is changed to other article, for example, it is possible to change the table memorized in the space information memory portion 4 and the setups of the attention position information calculator portion 5, the attention level calculator portion 6 and the totalize portion 9. In this instance, since the background picture follows the present commodity, it is possible to recognize the information of the present commodity, as well as, the background picture and the information of attention level. With doing this, totaling is conducted, newly; upon the attention level of said other commodity.

As is shown in FIG. 18, the information of attention level is displayed in the form of the bar graph. Also, the information of attention level to be displayed may be, for example, the number of persons paying attention, the number of times of paying attention, the time-period of paying attention, and the calculation results of the attention level estimation function mentioned above. Or, those may be the measured values per constant time-period or the longest continuing time-period of paying attention.

However, the bar graph mentioned above may be in the form of a circular graph or a pyramid-like graph, for example.

Also, the graph mentioned above may be displayed aside the commodity, which is displayed on the background picture. In case where there is no space between the commodities for showing a graph therein, as is shown in FIG. 18, it is possible to make the background transmit the graph therethorough, by letting the graph to have permeability. With doing this, it is possible to confirm the commodity on the background while also confirming the attention level by means of the graph. All of graphs of attention level to be composed on the background in the embodiment(s), which will be shown below, the attention position probability distribution, and the attention level distribution, etc., may be displayed with making the background permeable or transparent.

Figure 19:
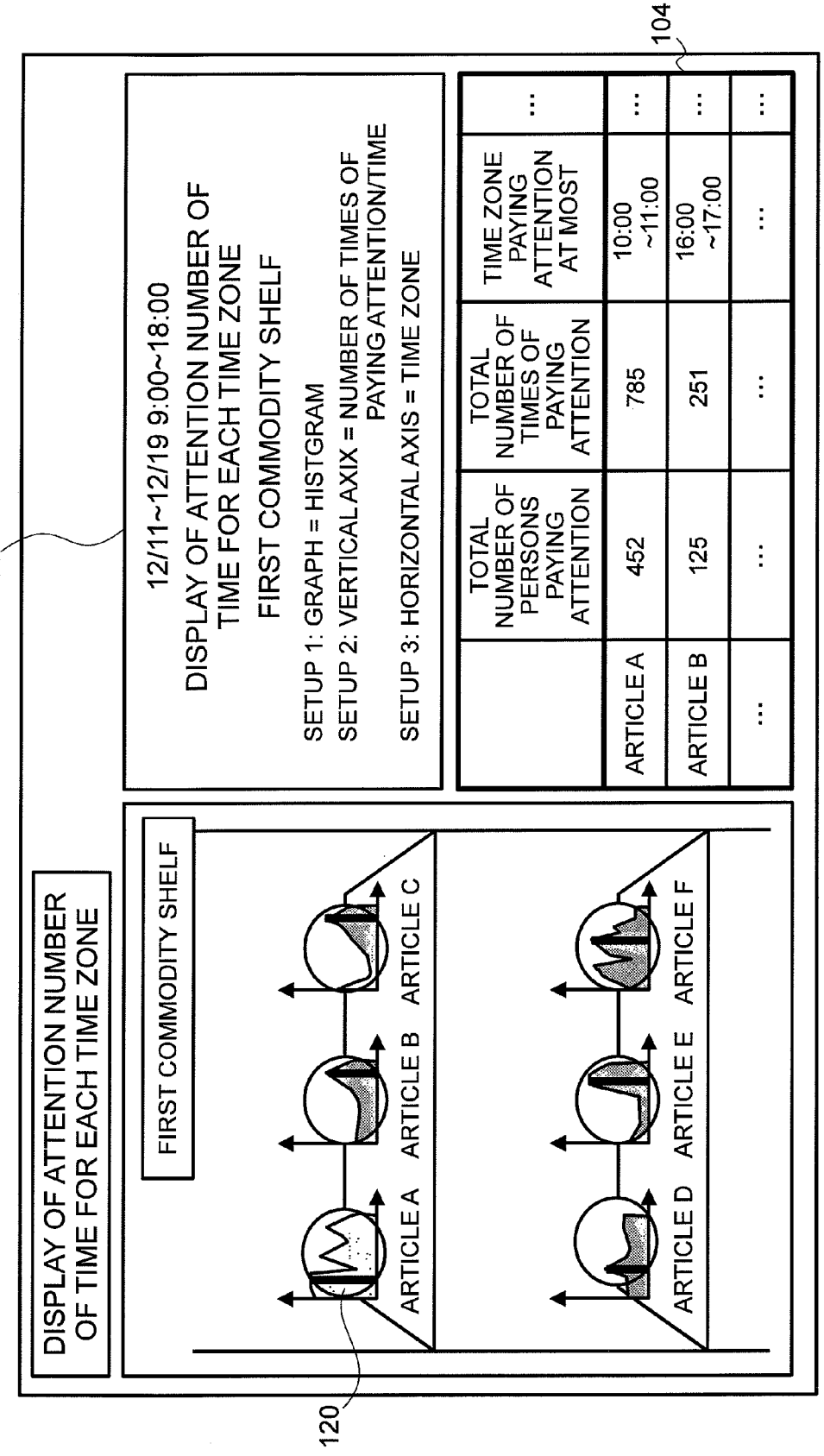
FIG. 19 is a view for showing an example of an output picture produced by an output control portion.

Also, as the attention level information as shown in FIG. 19, it is also possible to make display by composing the two-dimensional graph having the vertical axis and the horizontal axis (for example, a polygonal line graph, an area chart, a histogram, etc.) or a plural number of bar graphs with the background picture. In this instance, on the vertical axis is shown the time-period of paying attention, the number of persons paying attention, or the number of times of paying attention, etc., while on the horizontal axis the passage of time of measurement, the time zone, the method of paying attention.

For example, in case when comparing time-sequential changes of attention level among the plural numbers of articles, thereby making confirmation, there is obtained a relatively complex table when trying to express this in the form of the table, and therefore there is a possibility of bringing about difficulty of grasping the time-sequential change of attention level. In such the instance, with using the two-dimensional graph therein, it is possible to express the time-sequential changes of attention level or the like, in a relatively simple manner, and thereby enabling to easily understand the attention level for each article, time sequentially.

In an example of the table shown in FIG. 19, there is shown a histogram 120, as the information of the attention level, for example. With the present example of the display, there is shown the attention levels, which are measured at a specific time on a plural number of days, wherein the horizontal axis indicates the time zone while the vertical axis the number of times of paying attention per one (1) hour. Also, in this histogram, the time zone during when the attention level is at the highest is displayed with a color different from the other time zones, as a peak time zone, for each of the articles. The color of the peak time zone may be any color, but preferably be a color that can clearly distinguish it from the other time zones.

With doing such the display as mention above, for example, it is possible to grasp the attention level of the article, separately, for each time zone. Also, because the contents of totalizing/display are different from those shown in FIG. 18, then the contents of the display 103 of attention level measurement setup and the attention level detailed information display 104 are also different from, in addition thereto. On the display 103 of attention level measurement setup are displayed that the vertical axis indicates the number of times of paying attention, and that the horizontal axis indicates the time zones, etc.

Also, in the example of the display shown in FIG. 19, the attention level detailed information display 104 displays, for example, the time zone during which the number of times of paying attention is at the highest, in addition to the total number of persons paying attention and the total number of times of paying attention for each article, and thereby providing data for supplementing the attention level display data on the attention level information picture display 102.

Other than the two-dimensional graph explained in the above, it is also possible to show the attention level with using, such as, a circular graph, a donuts-like graph, a radar graph, a bubble graph, a pile-up bar graph, etc. With this, it is possible to compare the attention levels under the conditions different for each article, and thereby achieving an effect of enabling to grasp versatile estimation data of attention level, visually and easily.

Also, in FIGS. 18 and 19, the attention level is displayed for each of the commodities, but it is also possible to display the plural number of commodities, by dividing them into groups, while displaying the graphic information of attention level for each of those groups divided. It is possible to display the total attention level and the averaged attention level of plural numbers of articles on an upper shelf, and also the total attention level and the averaged attention level of plural numbers of articles on a lower shelf, etc., for example.

Also, cooperating the present system with a POS system, for example, it is possible to display sales on one of the parameters of the graphs mentioned above. In this case, it is possible to grasp the relationship between the sales and the attention levels at a glance, and thereby obtaining an effect of an easy understanding thereof.

Also, with applying the structures explained above therein, for example, it is possible to display the present eye direction of a customer, which can be obtained within the attention position information calculator portion 5, composing with the background picture in real-time. Herein, composing with the background picture in real-time means, that the graphics showing the present eye direction of the customer are renewed at a cycle, which may be set at one (1) frame, thereby to be displayed. This cycle should not be restricted to one (1) frame, but may be a constant one. Also, though expression is made "real-time", herein, but it does not means to have complete simultaneousness. Though it is preferable to display the information without delay, but there occurs at least a time lag, such as, processing time or the like. An example of display in this time is shown in FIG. 20.

Figure 20:
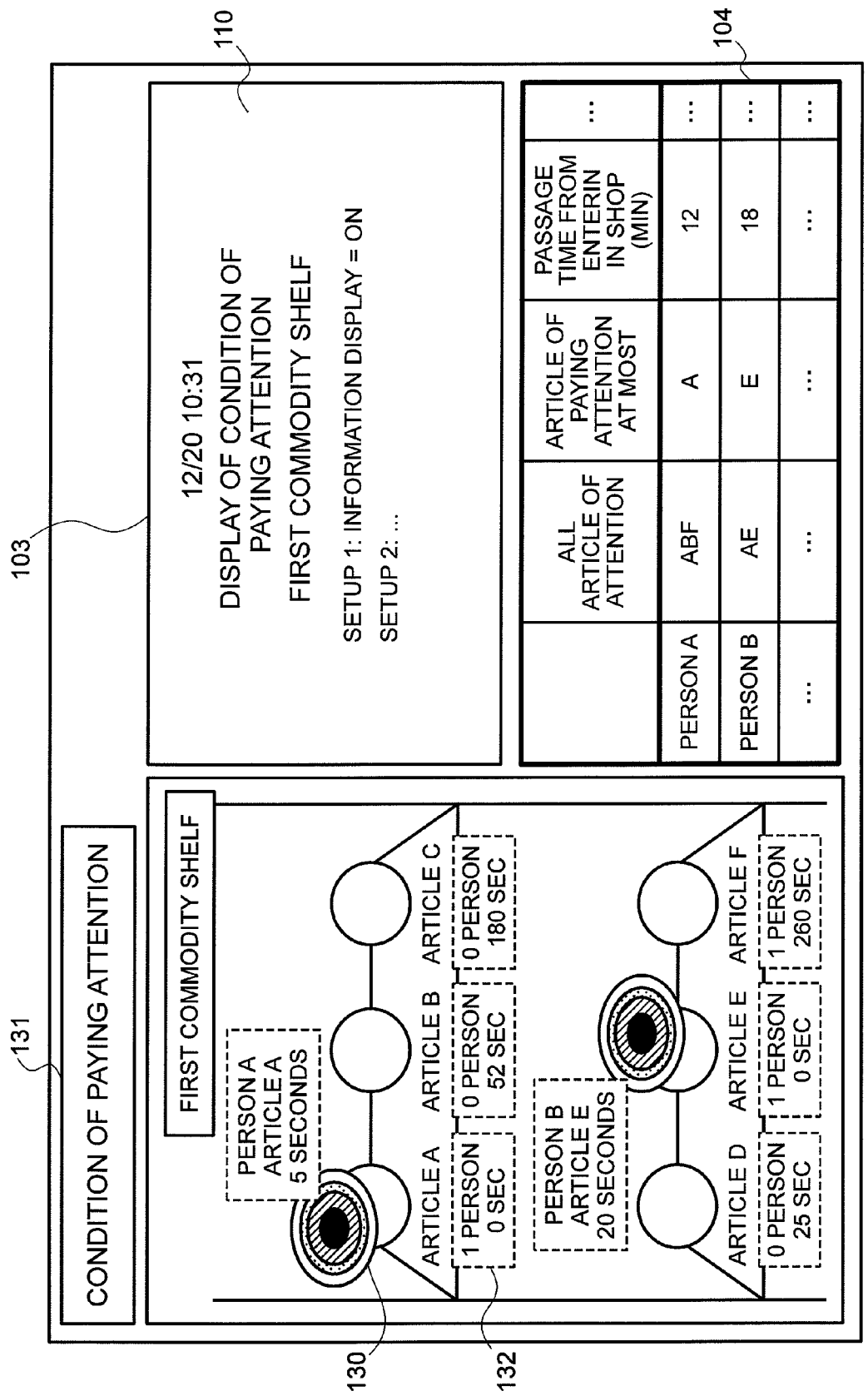
FIG. 20 is a view for showing an example of an output picture produced by an output control portion.

In the example shown in FIG. 20, the positions at which customers A and B look are displayed, respectively, with using the attention position probability distribution 130. Displaying of an attention information data display 131 at that instance or the like, together with the attention position probability distribution 130, fitting therewith, enables to grasp the attention conditions of the respective customers, easily. For example, in the example shown in FIG. 20, additionally displaying of the person of the attention position probability distribution, the article determined being paid with attention at present, and the passage of time of paying attention, continuously, on the article paid with attention at present, etc., it is possible to obtain the information for supplementing the display of the attention position probability distribution 130. Preferably, the attention information data display 131 moves in linkage with movement of the attention position probability distribution 130 on the display, since it is possible to prevent it from combining with the attention position probability distributions of the others.

Also, in addition to the display mentioned above, it is possible to display the information indicative of the present attention condition for each article, like an article data display 132, near to the display of each article. In the example shown in FIG. 20, the article data display 132 displays, for example, the present number of persons paying attention and a continuous non-attention time up to the present (i.e., the time measured by counting up the time-period, such as, second during when the attention is not paid, until now). With this, it is possible to grasp the attention condition of the article, as well as, the attention condition of the persons, at the same time, thereby achieving an effect it is useful for analysis of the attention level. The data to be displayed on article data display 132 may be others, as far as being data relating to the articles.

Also, in the example shown in FIG. 20, since also the display setup differs from, then display contents of the display 103 of attention level measurement setup and the attention level detailed information display 104 are also different from those shown in FIGS. 18 and 19. In the present example, for example, the display of the measuring time is the present time. Also, it is possible to display the condition of ON/OFF setup for displaying the data information, such as, the attention information data display 131 and the article data display 132 mentioned above, on the display 103 of attention level measurement setup.

In the example of the display shown in FIG. 20, the attention level detailed information display 104 displays all articles, upon which each of the persons measured pays attentions up to now, the article, upon which the attention is paid at the most, and the passage of time from the time starting from when entering into a store, etc.; thereby providing data for supplementing the attention level display data on the attention level information picture display 102.

With using such display of the attention condition as was mentioned above, a clerk working in the shop can grasp the article, upon which the customers shows the interests, in real-time. Therefore, it is possible for the clerk to talk with the customer, so as to give an accurate explanation of the article, responding to the attention paid by the customer, and thereby stimulating purchasing of the customer.

In the explanation given in the above, there are proposed various methods for displaying the output of the attention level, however the display may be made by exchanged them. In this instance, the exchange of the displays is conducted by the output control portion 7, in cooperation with the space information memory portion 4 and/or the totalize portion 9. With doing such exchange, it is possible to provide a display method, fitting with the needs for analyzing the attention level by the user of the present attention level measurement apparatus.

In the explanation mentioned above, as was shown in FIG. 1, it is assumed that the output control portion 7 is within the attention level measurement unit, and in this case, it outputs the composed picture to the output portion; however, the output portion 8 may have the output control portion 7 therein. In this case, for example, the space information memory portion 4 outputs the data requested to the output control portion 7 of the output portion 8. Further, the totalize portion 9 of the attention level measurement unit conducts the operations, such as, the totalizing, which is requested to the output control portion 7 of the output portion 8, and an output of the totalizing result to the output control portion 7.

(Output Portion)

The output portion 8 maybe made from various kinds of displays (such as, CRT, a liquid crystal display, a plasma display, a projector, and other types of displays), or may be an printing device, such as, a printer, etc., other than the monitor explained in the above.

In case where the output portion 8 is made from the printing device or the like, it is possible to print out the picture obtained by composing the background picture and the attention level explained by referring to FIG. 18 or 19, to be used as a material.

With the embodiment explained in the above, it is possible to confirm the measuring target of attention level, together with the attention level relating to the respective measuring target, and thereby enabling to grasp the attention level data, preferably.

Second Embodiment

Next, explanation will be given on a second embodiment, according to the present invention.

With the second embodiment, expanding the measuring target of attention level from the specific article(s) to the entire space, in the attention level measurement unit of the first embodiment, the calculation result of the attention level distribution thereof is provided as an output.

With applying the present embodiment, it is possible to calculate the attention level with respect to planes, such as, a wall, a ceiling, etc., within a wide space, such as, a station or facilities, for example. An example of an output of the attention level distribution obtained by the present embodiment will be shown in FIG. 21.

Figure 21:
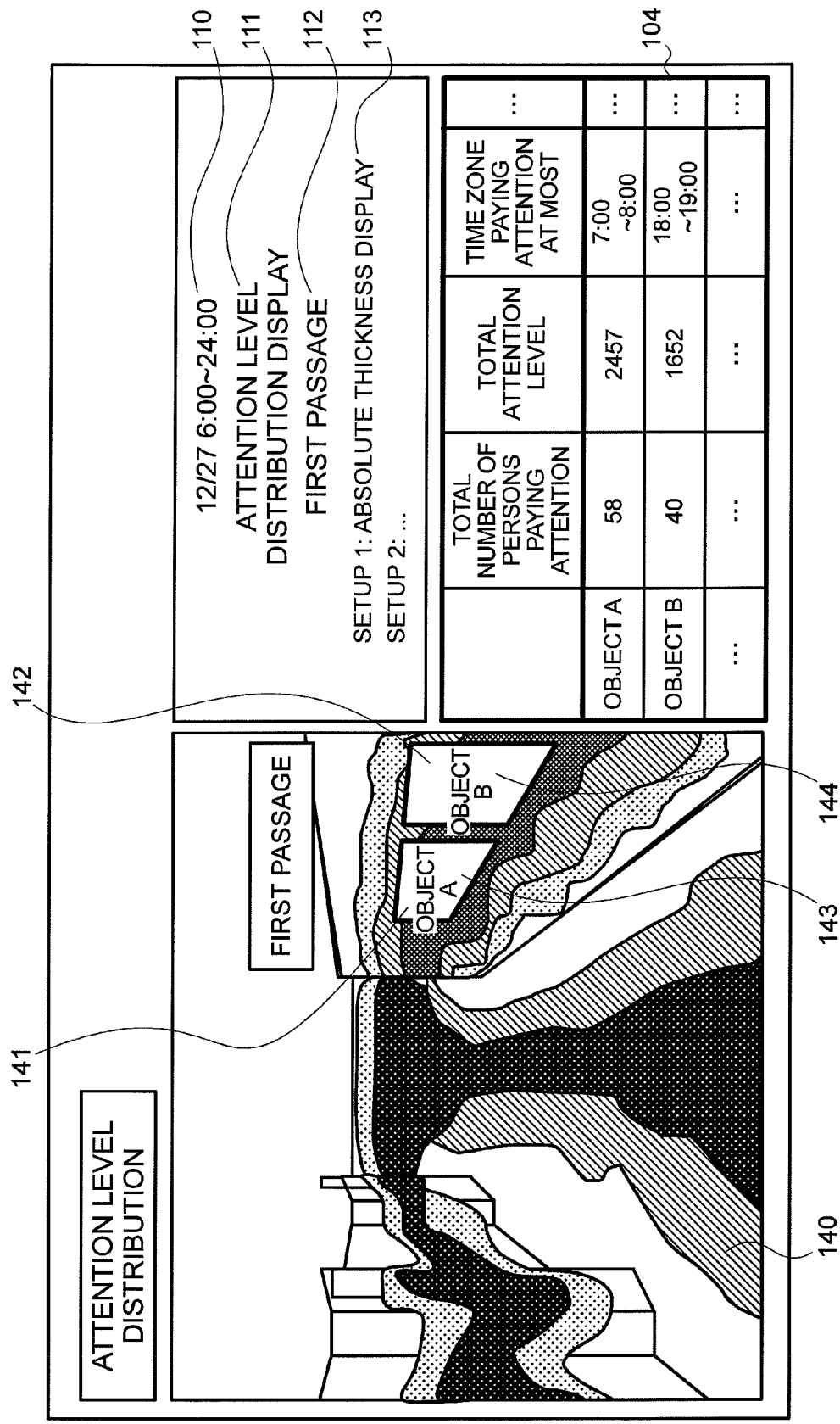
FIG. 21 is a view for showing an example of an output picture produced by an output control portion.

In this FIG. 21, a attention level distribution display 140 is that showing the height of attention level in a contour-like manner, wherein the density of distribution indicates the magnitude of the attention level. With this, it is possible to make measurement, i.e., where attention is paid much within the entire space; for example, it is possible to provide the output, as the information useful for determining the location of providing advertisement, or for changing layout in exhibition, etc. Also, it may be used to be a psychological laboratory device to passersby, for example.

Figure 22:
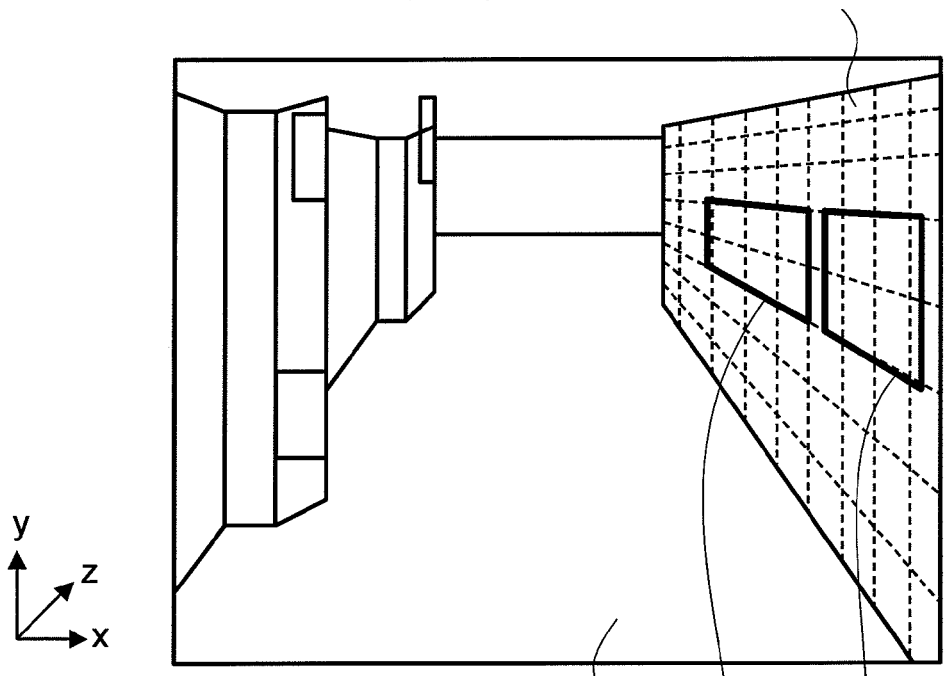
FIG. 22 is a view for showing an example of the position information of the space, which is memorized in the space information memory portion.

In case when calculating the distribution of the attention level within a certain space, as a. whole, as is shown in FIG. 21, the space information memory portion 4 may have the space information for each of lattice-like regions or areas, as is shown in FIG. 22.

Thus, in the embodiment 1, there is provided the information of the specific planes where the attention level measuring targets lies, such as, the exhibition shelves for articles, etc., for example. On the contrary to this, according to the present embodiment, such as, a wall, a ceiling, and a column, etc., for example, the surfaces defining the space are so construed, so that they have the information of equations of planes, as is shown in FIG. 22. Also, in the embodiment 1, setup is made on the coordinate range or area where each article lies, on a plane where the measuring target lies. On the contrary to this, according to the present embodiment, divided regions or areas are designated for each of the planes defining the space, for example. With the setup in such the manner, it is possible to obtain a coordinate range of small area, by dividing each of the planes defining the space.

However, the number and the size thereof may be designated for each of the divided region, by designating values of the region, or by simply designating the division numbers in the vertical/horizontal directions on the plane. The more the division number, the more details can be obtained of the information of distribution.

Within the present embodiment, it is assumed that the space of the attention level measuring target as shown in FIG. 21 is outputted, in the form of CG, to be displayed, to be the space differing from the space, which is photographed by the image pickup portion 1, for example. However, this space may be the space that is photographed by the image pickup portion 1, for example. Also, this may be a space, which is photographed by the image pickup portion 2 in the embodiment 1. Also, this may be a space data made up with the space coordinate data, which is set up or inputted by a user.

Within the attention level calculator portion 6, according to the present embodiment, in the similar manner to the attention level measuring target surface in the embodiment 1, calculation is made on the attention position and the attention position probability distribution on the planes building up the space mentioned above, with the vector distribution of the measurement error distribution between the calculated eye direction and the eye direction or the probability density distribution. Following to the above, calculation is made on an averaged attention position probability for each divided region or an attention position probability at the representative point on the each divided region. Then, with using those, they are influences on the attention level information, in the following manner.

The relationship between the attention position and the attention position probability calculated in the above is as shown in FIG. 25, for example.

Next, with using the attention position calculated from the picture of one (1) frame in the above and the attention position probability calculated in each divided region, integration is made for each frame, assuming the maximum value or the averaged value of the attention position probability in each divided region to be the attention level for that region. However, the value of the attention position probability for each of those divided regions is held in the space information memory portion 4.

In case when applying such calculation method as was mentioned above therein, comparing to the case when counting only the number of times of paying attention, in the attention determination by the attention position, it is possible to calculate out the attention level, weighted with the probability in plural regains. Therefore, it is possible to obtain the attention level information distributed smoothly at each position.

Figure 26:
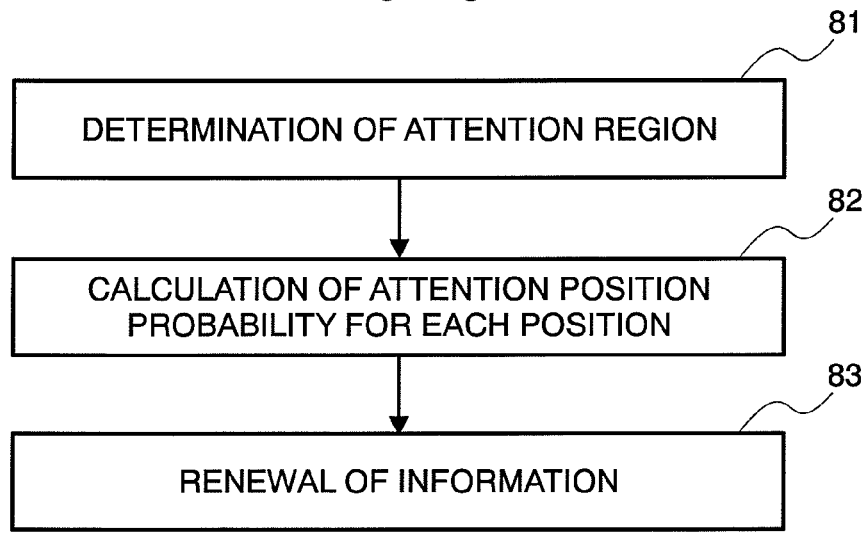
FIG. 26 is an example of flowchart for showing the processes in an attention level calculate portion.

FIG. 26 shows a flow of calculation, within the attention level calculator portion 6, according to the present embodiment. In a step 81, the divide region is determined within the attention position probability distribution range. Next, the attention position probability is determined within each divided region in a step 82. Finally, in a step 83, the attention level obtained is added to the present attention level for each divided region, which is memorized in the space information memory portion 4, thereby obtaining the attention level for each divided region, newly.

Within the output control portion 7, according to the present embodiment, the attention level, which is memorized in the space information memory portion 4, as is shown in FIG. 21, is converted into a tint or color thickness, so as to paint the position with this on the picture of the divided region, and thereby outputting it to be the picture of graphic information of showing the distribution of attention level in each divided region. With this, it is possible to notice the distribution of the attention level to the space, visually and intuitively, which cannot be grasped only with an aid of the table.

Also, in relation to the association between the display color or thickness thereof and the attention level, it may be made between an absolute value of the attention level and the display color or thickness thereof, as is mentioned above, for example. However, the color or the thickness thereof has a limit in the extent of ability of expression. Therefore, with associating a value normalizing the attention level for each region with the display color or the thickness thereof, it is possible to resolve such problem in relation to this limit.

As an example of the value for normalizing, it is possible to use the maximum value of the attention level all over the entire region on the time zone designated, for example, and in this case, it is possible to grasp a ranking for each of the regions on that time zone. Also, a constant value being fully large may be used as the value for normalizing. In this instance, it is possible to use a common value, to be the value for normalizing, even when comparing the different data on the two (2) time zones, and since no change occurs in a criterion for associating the attention level with the display color or the thickness thereof, therefore it is possible to make time-sequential comparison of attention level, with ease.

The distribution of the attention is displayed on the CG, with an aid of the display color or the thickness thereof, in the explanation given in the above, however in case if the space of the attention level measuring target is the pictures that are photographed by the first image pickup portion 1 or the second image pickup portion 2, as was mentioned above, it is possible to compose the attention level displayed with the display color or the thickness thereon, with applying those to be the background pictures. With this, it is possible to estimate the attention level while confirming more delayed conditions of surrounds thereof. Also in this case, if changing the region of the display color or the thickness to be semitransparent, as is the two-dimensional graph shown according to the embodiment 1, then the attention level and the picture on background can be confirmed, simultaneously, and therefore achieving an effect of enabling to confirm the attention level and the surrounding condition, with much easy.

Also, in the output or display of the attention level distribution explained above, the planes on the space are the surfaces to be measured the attention levels thereof. However, such the surface to be measured may be curved surfaces. In this case, connecting the planes in plural numbers thereof, continuously, at a predetermined angle, it is possible to set up a surface approximating to the curved surface. With this, even a complex space can be the attention level measurement target, thereby achieving an effect of increasing the degree of freedom of measurement and display.

Also, as shown by an example of display in FIG. 21, on the display picture of the space, i.e., the attention level measurement target, a specific object may be displayed, thereby enabling to confirm the attention level distribution, as well as, necessary information thereof, in addition.

In the example of the display shown in FIG. 21, it is so set up that an object A141 and an object B142 are displayed. In order to confirm those and an attention level distribution display 140, in addition thereto, it is preferable to make either the attention level distribution display or the objects semitransparent, within the area or region where the objects lie. When displaying, it is further preferable to display the names of the objects, as is shown by reference numerals 143 and 144, because it enables the information to be grasped much easily.

On the display 103 of the attention level measurement setup, there may be displayed a setup for association with the display color or the thickness thereof mentioned above. Thus, in the example of the display shown in FIG. 21, "an absolute thickness display" is displayed for indicating that an absolute value is associated with the display color or the thickness thereof, for example.

Also, in this case, for example, as is shown in FIG. 21, on the attention level detailed information display 104 may be displayed the data in relation to the attention level for each object, etc.

In the example of the display shown in FIG. 21, the attention level detailed information display 104 displays thereon, for example, the number of persons paying attention on each setup object during the measurement time, the total attention level, the time zone during when the attention level is at highest, etc., thereby providing the data for supplementing the attention level display data on the attention level information picture display 102.

For such setup of the object, as similar to the setup of the measuring target surface within the space as mentioned above, for example, such space information is given, as is indicated by the equations shown in FIG. 22.

Also, the calculation mentioned above of the data in relation to the attention level for each object, may be conducted by the method similar to that shown in the embodiment 1, for example. Thus, for example, the attention level calculator portion 6 may calculate the attention level, and this may be stored in the space information memory portion 4, whereby totalizing this in the totalize portion 9.

In case of applying the attention level measurement unit for analyzing an effective arrangement of advertisement, it is enough to set the specific objects explained above to be an object indicative of the region where the advertisement is arranged at present. In this case, there can be obtained an effect of making the comparison of attention levels, easy, between the present position of the advertisement and the positions of others.

Also, in case when using the attention level measurement unit for analyzing the attention level within the shop as a whole, etc., the object mentioned above may be that indicating the region of the commodity shelves as a whole, or the positions of articles. In this instance, at the same time, there may be displayed the information relating to the article, such as, a name of the article, etc. In those cases, there can be obtained an effect of enabling to grasp the relationship between the information of the articles and the attention levels of the surrounding.

Further, in this instance, the information of the attention level, which is calculated or totalized, maybe displayed, as video information, such as, the graph, as is shown in the embodiment 1, in addition thereto. In this case, there can be obtained an effect of enabling the comparison of the attention level distribution in particular, between the detailed attention level data for each article and the space of the surrounding thereof (such as, the space in the shop, as a whole).

With the embodiment explained in the above, it is possible to widen the measurement target of attention level to the space as a whole thereof, widely, and to grasp the attention level data, preferably.

Embodiment 3

Next, an example of the equipment structures will be shown of an attention level measuring apparatus, which was explained in the embodiment 1 or the embodiment 2.

Figure 27:
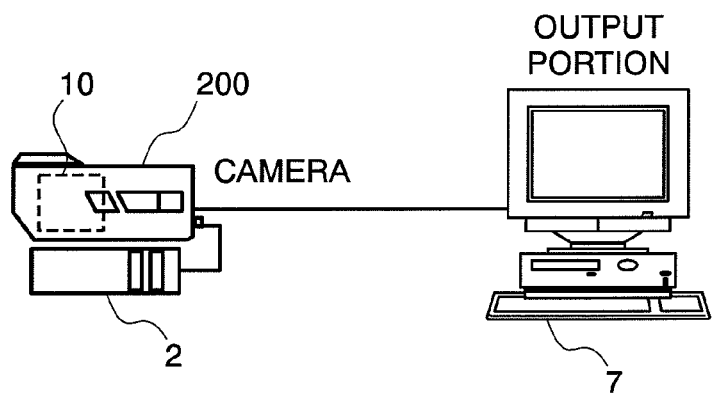
FIG. 27 is a view for showing an embodiment of the structures, according to the present invention.

FIG. 27 shows an example of the system configuration when installing the attention level measurement unit into the camera. The eye direction measurement portion 3, the space information memory portion 4, the attention position information calculator portion 5, the attention level calculator portion 6, the output control portion 7 and the totalize portion 9 shown in FIG. 1 are unified as an attention level measurement unit 10, and this attention level measurement unit 10 is installed into the camera. With this, it is possible to build up an attention level measurement camera 200 having a function of measuring the attention level at the position where a user designate.

In the present embodiment, within the camera 200 is provided a memory medium, such as, a memory, etc., thereby having a function of the space information memory portion 4, for example. In the similar manner, within the camera 200 is prepared a processor for use of video processing, and therefore it has functions, such as, the eye direction measurement portion 3, the attention position information calculator portion 5, the attention level calculator portion 6, the totalize portion 9 and the output control portion 7, etc. Herein, although the person position measurement portion 2 is described to be separate from the cameral 200, in FIG. 27, however a portion of all of the functions of the person position measurement portion 2 may be equipped with the camera 200.

Also, mounting a direction sensor and/or a GPS within the camera 200, for example enables to capture the present position, automatically. With this, it is possible to calculate the attention position, but without necessity of conducting setup of the camera position into the space information memory portion 4.

Figure 28:
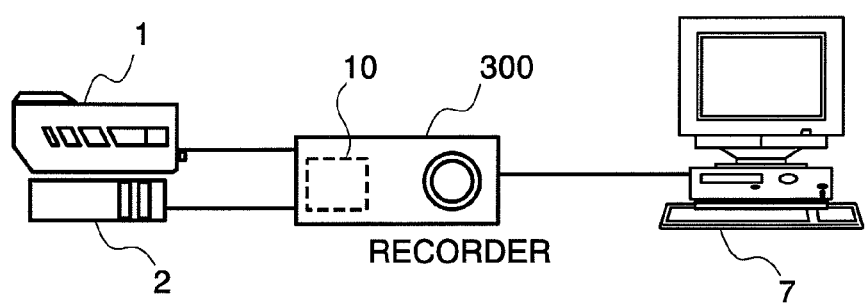
FIG. 28 is view for showing an embodiment of the structures, according to the present invention.

FIG. 28 shows an example of the system configuration, when installing the attention level measurement unit into a recorder for observation video, installing therein a recording medium, such as HDD, etc. For example, the recorder 300 has a function of piling up the pictures from the image pickup portion 1 connected thereto, and it further comprises the attention level measurement unit 10. With this, it is possible to build up the recorder having a function of calculating the attention level. In this case, the attention level may be calculated in real-time onto the picture transmitted from the image pickup portion 1 connected with the recorder 300, to be recorded together with the picture. Also, it is possible to conduct the calculation of attention level thereafter, onto the picture recorded within the recorder. In the latter case, it is possible to calculate it again, with changing the parameters to be used in calculation of the attention level.

As was mentioned above, the output control portion 7 of the attention level measurement unit 10, as shown in FIGS. 27 and 28, may have by the output portion 8 shown in FIGS. 27 and 28, as was explained in the embodiment 1. Also, the output portion 8 in FIG. 27 may be unified with the camera 200, or the output portion 8 in FIG. 28 may be unified with the recorder 300.

Also, both the examples in FIGS. 27 and 28 may be connected with the camera, being the second image pickup portion explained in the embodiments 1 and 2. And, it is possible to construct so that the attention level measurement unit 10 can obtain image pickup data differing from that obtained by the camera 100 or the camera 1.

With the embodiment explained in the above, it is possible to build up a system for measuring and displaying the attention level, and thereby providing an apparatus and a system for enabling to grasp the attention data, preferably.

Embodiment 4

Next, an embodiment of an electronic advertisement system will be shown, in which the target of measurement is an electronic advertisement, with applying the attention level measurement system shown in any one of those mentioned above.

Figure 29:
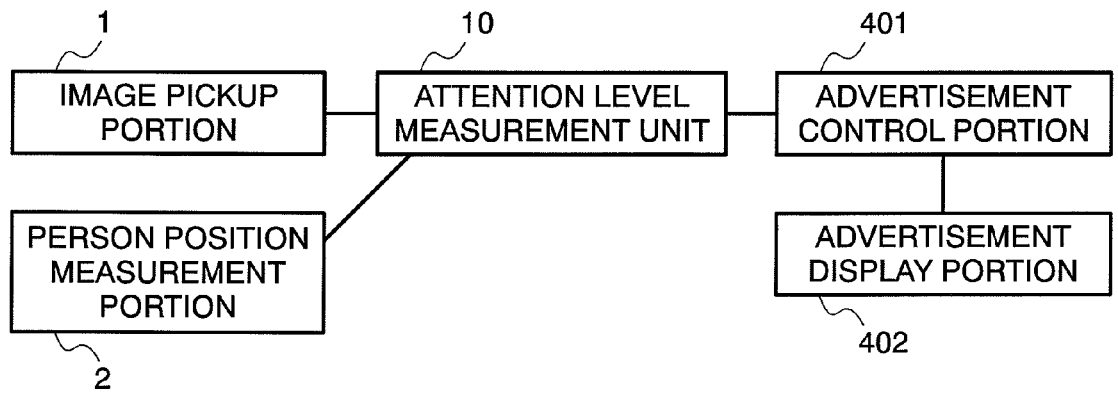
FIG. 29 is a block diagram for showing an embodiment, according to the present invention.

FIG. 29 is a block diagram for showing the structures of the present system. For example, to the attention level measurement unit 10 explained in the embodiment 1 are connected the image pickup portion 1 and the person position measurement portion 2, which are also explained in the embodiment 1, and the attention level measurement unit 10 is further connected to an advertisement control portion 401, while the advertisement control portion 401 is connected to an advertisement display portion 402.

Figure 30:
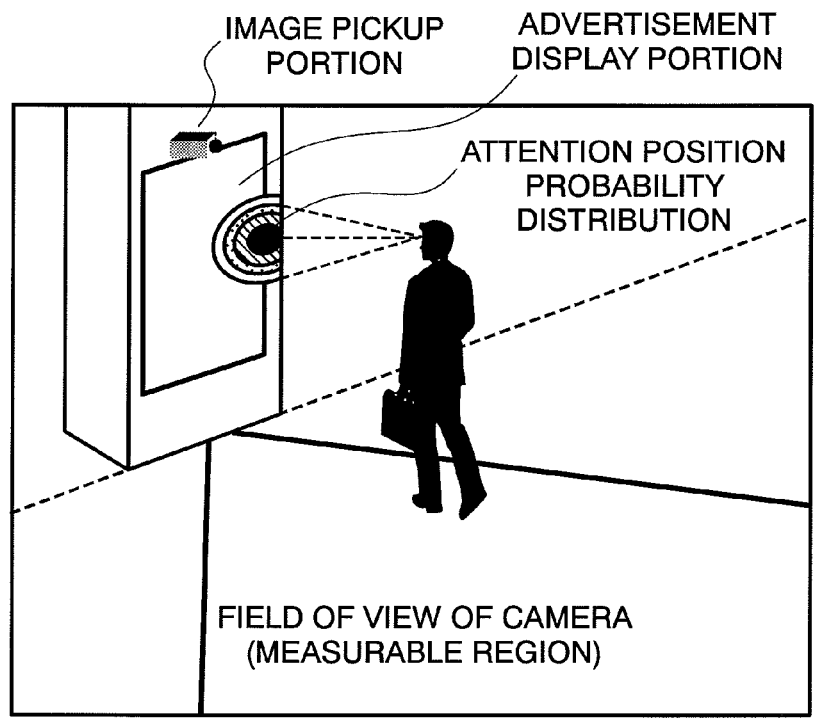
FIG. 30 is a view for showing an embodiment of the structures, according to the present invention.

Also, FIG. 30 is a looking down view for showing this system. In an example shown in FIG. 30, there are shown the image pickup portion, which is provided on a wall of a passage, and the advertisement display portion and a person standing on that passage.

In this instance, it is preferable to embed the attention level measurement unit and/or the advertisement control portion on the rear of the advertisement display portion, etc., so as not be seen from an outside thereof.

In the example shown in FIG. 30, there is shown further the attention position probability distribution of the person. The attention position probability distribution mentioned above can be calculated, for example, by means of the attention level measurement unit 10, the image pickup portion 1 and the person position measurement portion 2, in the similar manner to that in the embodiment 1. Also, with applying the similar method as in the embodiment 1, it is possible to calculate and totalize the attention level onto the advertisement display portion 402. Similar to the embodiment 1, not only the attention position information, but also with using the attention level information applying the attention position probability distribution therein, it is possible to obtain continuous attention level information, for a small number of persons, and thereby obtaining an effect of enabling various kinds of method for totalizing the attention level.

Also, the advertisement control portion 401 and the advertisement display portion 402 buildup, so-called an electronic advertisement apparatus. The advertisement control portion 401 controls, so that the advertisement display portion 402 displays the electronic data of advertisement contents, such as, a picture, for example. The electronic data, as being the advertisement contents, may be held within the memory portion, which is provided in the electronic advertisement apparatus, for example, or may be distributed to the electronic advertisement apparatus with using a network or digital broadcasting.

With the present system, since it is possible to totalize the attention level onto the advertisement paid by the passersby in the surrounding thereof, therefore it is possible to know the effect of the said electronic advertisement. For example, linking the attention level for each time zone and the data of reproducing schedule of advertisement enables to calculate, how much attention be paid for each of the advertisements distributed.

Also, with the present embodiment, it is possible to calculate a method or manner of paying attention, and/or an averaged time per one (1) time of paying attention, etc. For this reason, it is possible to obtain detailed information, such as, it is seen by a large number of peoples, but almost of them are of a degree of glancing by eyes at a moment, etc., and therefore it is possible to obtain information, being helpful for producing the advertisement contents, newly.

It is also possible to conduct the advertisement display depending on the condition of the attention level. For example, within the time zone when the number of persons paying attention is very small, it is possible to spread a motion picture, trying to increase the attention level for one (1) person of the passersby.

Also, in case when the number comes up of the persons paying attention, it is possible to try to increase the attention level by displaying a still picture, which is extracted by only a portion to be advertised at the most.

Also, in case where restriction is made on the view field of the camera, i.e., the image pickup portion, and therefore it is impossible to cover all of the persons, it is possible to use two (2) sets of camera or more.

On the contrary to this, when building up with only one (1) camera, it can be considered to add a function of presumably counting the number of persons paying attention onto the advertisement, but not counted, actually. This may be presumed upon statistic data, such as, the total number of the passersby surrounding the advertisement, the number of persons paying attention onto the advertisement among of them, and the region of view field of the camera, etc., at that time, for example.

Also, since an image taken of a person standing far from the camera comes to be relatively small within the picture, there is a case that measurement cannot be made on whether she/he pays attention to the advertisement or not. In such case, similar to the range of view field, it is also possible to presume the number of paying attention onto the advertisement, standing within measurable distance, upon basis of the present measurement condition and the statistic data.

However, within the electronic advertisement display system explained in the above, there may be provided the output control portion and the output portion, similar to the other embodiments. In this case, it is possible to obtain an output for enabling to grasp or capture the attention level, intuitively, with setting plural numbers of advertisement displays to be the target of totalizing of the attention level. Also, it is possible to confirm together with the attention level in the space as a whole, where the advertisement display is made, and thereby enabling further wide analysis in relation to the display of the electronic advertisement.

According to the embodiments explained above, it is possible to build up the electronic advertisement display in linkage with the measurement of the attention level, and thereby providing a system enabling measurement of the attention level onto the electronic advertisement, and enabling to conduct the advertisement display with using the attention level data, preferably.

In the explanation given all of the embodiments, for the convenience of explanation, as the example of measurement of attention level, mainly, it was made on the example of setting the articles for commerce in the shop, as the target of measurement, or applying into the measurement of the attention level to the advertisement, etc., however the present invention should not restricted to those uses only.

Also, any of the embodiments explained in the above may be in one (1) embodiment, combining with any other of them.

INDUSTRIAL UTILITY

The apparatus or system according to the present invention may be utilized to be a new video observation system having function of measuring the attention level, being installed into the video observation system presently available, for example. Also, applying this into the electronic advertisement display system, it is possible to obtain a new advertisement system having a function of measuring the attention level onto the advertisement; i.e., being applicable into various system.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and
wherein the graphic information of said attention level presents a spatial distribution of the attention level.

2. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and
wherein the graphic information of said attention level presents an attention time-period paid onto said attention target.

3. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and
wherein the graphic information of said attention level presents a number of times paying attention onto said attention target.

4. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and
wherein as graphic information of said attention target there is used an image data of said attention target.

5. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and
wherein as graphic information of said attention target there is used a picture memorized in advance.

6. An attention level measuring apparatus, comprising:
an eye direction measurement unit, which is configured to input image data and to measure an eye direction of a person photographed;
an attention position information calculate unit, which is configured to calculate attention position information of said person, from the eye direction measured by said eye direction measurement unit;
a person-attention-level calculate unit, which is configured to calculate person-attention-level information regarding a person-attention-level parameter about an attention target of said person, with using the attention position information calculated by said attention position information calculate unit;
an output control unit, which is configured to record graphic information produced upon a basis of said calculated person-attention-level information and a picture of said attention target, corresponding one to the other; and wherein the graphic information of said attention level includes a portion permeating a background picture therethrough.

7. An attention level measuring apparatus, comprising:

an eye direction measurement unit, which is configured to input image data and to measure an eye direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein the picture of said attention target presents plural number of the attention targets thereon, and the graphic information of said attention level presents the attention level information, each corresponding to said plural numbers of attention targets, wherein said graphic information is displayed corresponding to a position corresponding to each of said attention targets, which are indicated on the pictures of said attention targets.

8. An attention level measuring apparatus, comprising:

an eye direction measurement unit, which is configured to input image data and to measure an eye direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein the graphic information of said attention level is a graph for showing the attention level.

9. The attention level measurement apparatus, as described in the claim 8, wherein said graph is a two-dimension graph.

10. An attention level measuring apparatus, comprising:

an eye direction measurement unit, which is configured to input image data and to measure an eve direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein the graphic information of said attention level is renewed at a predetermined period.

11. An attention level measuring apparatus, comprising:

an eye direction measurement unit, which is configured to input image data and to measure an eve direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein the graphic information of said attention level presents a magnitude of the attention level with using distinction of gradation of a color.

12. An attention level measuring apparatus, comprising:

an eye direction measurement unit, which is configured to input image data and to measure an eye direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein the graphic information of said attention level is presented by a color differing depending on a magnitude of the attention level.

13. An attention level measuring apparatus, comprising:

an eye direction measurement unit, which is configured to input image data and to measure an eye direction of a person photographed;

an attention position information calculate unit, which is configured to calculate attention position information of said person, from the eye direction measured by said eye direction measurement unit;

a person-attention-level calculate unit, which is configured to calculate person-attention-level information regarding a person-attention-level parameter about an attention target of said person, with using the attention position information calculated by said attention position information calculate unit;

an output control unit, which is configured to record graphic information produced upon a basis of said calculated person-attention-level information and a picture of said attention target, corresponding one to the other; and wherein a table produced upon a basis of the person-attention-level information calculated is displayed, in addition thereto.

14. An attention level measuring system, comprising:

an image pickup unit, which is configured to photograph a person;

an attention level measurement unit, which is connected to said image pickup unit; and an output unit, which is connected to said attention level measurement unit, and configured to output a measurement result of the attention level measurement unit as information being visually recognizable, wherein said attention level measurement unit includes: an eye direction measurement unit, which is configured to input image data and to measure an eye direction of a person photographed; an attention position information calculate unit, which is configured to calculate attention position information of said person, from the eye direction measured by said eye direction measurement unit; a person-attention-level calculate unit, which is configured to calculate person-attention-level information regarding a person-attention-level parameter about an attention target of said person, with using the attention position information calculated by said attention position information calculate unit; and an output control unit, which is configured to record graphic information produced upon a basis of said calculated person-attention-level information and a picture of said attention target, corresponding one to the other; and an image pickup unit, which is connected to said attention level measurement unit and configured to photograph the measuring target of attention level.

15. The attention level measuring system, as described in the claim 14, further comprising:

a person position measurement unit, which is connected to said attention level measurement unit and configured to measure a position of the person.

16. An attention level measuring system, comprising:

an image pickup unit, which is configured to photograph a person;

an attention level measurement unit, which is connected to said image pickup unit;

an advertisement display unit;

an advertisement control unit, which is configured to control said advertisement display unit; and an advertisement display unit, which is connected to said advertisement control unit;

wherein said attention level measurement unit includes: an eye direction measurement unit, which is configured to input image data and to measure an eye direction of a person photographed; an attention position information calculate unit, which is configured to calculate attention position information of said person, from the eye direction measured by said eye direction measurement unit; a person-attention-level calculate unit, which is configured to calculate person-attention-level information regarding a person-attention-level parameter about an attention target of said person, with using the attention position information calculated by said attention position information calculate unit;

wherein said advertisement control unit changes display contents on said advertisement display unit, upon a basis of said attention level information; and wherein said person-attention-level information is calculated with using a probability distribution of the attention position, which is calculated upon a basis of the eye direction measured.

* * * * *